(12) United States Patent
Bouevitch

(10) Patent No.: US 6,810,169 B2
(45) Date of Patent: Oct. 26, 2004

(54) WAVELENGTH SWITCH WITH INDEPENDENT CHANNEL EQUALIZATION

(75) Inventor: Oleg Bouevitch, Gloucester (CA)

(73) Assignee: JDS Uniphase Inc., Ottawa (CA)

( * ) Notice: Subject to any disclaimer, the term of this patent is extended or adjusted under 35 U.S.C. 154(b) by 316 days.

(21) Appl. No.: 10/164,698

(22) Filed: Jun. 10, 2002

(65) Prior Publication Data

US 2002/0181858 A1 Dec. 5, 2002

Related U.S. Application Data

(63) Continuation-in-part of application No. 09/729,270, filed on Dec. 5, 2000, now Pat. No. 6,498,872.
(60) Provisional application No. 60/183,155, filed on Feb. 17, 2000.

(51) Int. Cl.⁷ .............................. G02B 6/28; H04J 14/02
(52) U.S. Cl. .............................. 385/24; 385/37; 385/47; 385/140; 359/130; 359/246; 359/247; 359/301
(58) Field of Search .................................. 359/122, 128, 359/124, 130, 131, 245–247; 385/15, 16, 18, 24, 37, 47, 140; 349/143, 146

(56) References Cited

U.S. PATENT DOCUMENTS

| | | | |
|---|---|---|---|
| 4,367,040 A | 1/1983 | Goto | 356/44 |
| 5,414,540 A | 5/1995 | Patel et al. | 359/39 |
| 5,477,350 A | 12/1995 | Riza et al. | 359/39 |
| 5,499,307 A | 3/1996 | Iwatsuka | 385/11 |
| 5,740,288 A | 4/1998 | Pan | 385/11 |
| 5,745,271 A | 4/1998 | Ford et al. | 359/130 |
| 5,847,831 A | 12/1998 | Tomlinson, III et al. | 356/364 |
| 5,917,625 A | 6/1999 | Ogusu et al. | 359/130 |
| 5,999,672 A | 12/1999 | Hunter et al. | 385/37 |
| 6,097,859 A | 8/2000 | Solgaard et al. | 385/17 |
| 6,275,312 B1 | 8/2001 | Derks et al. | 359/117 |

FOREIGN PATENT DOCUMENTS

| | | |
|---|---|---|
| EP | 0 654 917 A | 4/1995 |
| EP | 0 859 249 A | 8/1998 |
| EP | 0 947 865 A | 10/1999 |
| WO | WO 99/38348 | 7/1999 |

OTHER PUBLICATIONS

S.W. Knight et al., "Wavelength dependence of persistent photoconductivity in indium–doped $Pb_{1-x}Sn_xTe$", Semiconductor Science and Technology, Institute of Physics. London, GB, vol. 5, No. 3–S, Mar. 1, 1990, pp. S155–158.

Joseph E. Ford et al., "Wavelength Add–Drop Switching Using Tilting Micromirrors", Journal of Lightwave Technology, IEEE, vol. 17, No. 5, May 1999, pp. 904–911.

"Wavelength Add–Drop Switching Using Tilting Micromirrors", Ford et al., Journal of Lightwave Technology, vol. 17, No. 5, May 1999, pp. 904–911.

"Dynamic Spectral Power Equalization Using Micro–Opto––Mechanics", Ford and Walker, IEEE Photonics Technology Letters, vol. 10, No. 10, Oct. 1998, pp. 1440–1442.

*Primary Examiner*—Hemang Sanghavi
*Assistant Examiner*—Omar Rojas
(74) *Attorney, Agent, or Firm*—Teitelbaum & MacLean; Neil Teitelbaum; Doug MacLean

(57) ABSTRACT

A modular optical platform for selective wavelength switching that can be adapted to perform various other functions, such as dynamic gain equalization (DGE) and add/drop multiplexing (ADM) provides the versatility and modularity that will be essential to the future of the fiber optics industry. The basic platform includes a first lens for directing an optical signal, a diffraction grating for dispersing an optical signal into its component wavelength channels, a second lens for directing the component wavelength channels, and a modifying device for conducting one or more of a variety of functions including switching, DGE and ADM. The first and second lens are preferably replaced by a single concave reflective mirror having optical power. The modifying means according to the present invention includes a first array of liquid crystal elements positioned in a first set of paths, a second array of liquid crystal elements in a second set of paths, and a polarization beam director for directing the component wavelength channels between the first and second set of paths based on the polarization of the wavelength channels.

17 Claims, 15 Drawing Sheets

WAVELENGTH SWITCH WITH INDEPENDENT CHANNEL EQUALIZATION

CROSS-REFERENCE TO RELATED APPLICATIONS

This application is a continuation-in-part of U.S. patent application Ser. No. 09/729,270 filed Dec. 5, 2000 now U.S. Pat. No. 6,498,872 and claims the benefit of Provisional application No. 60/183,155 filed Feb. 17, 2000.

TECHNICAL FIELD

The present application relates to a wavelength selective optical switch platform, and in particular to a wavelength selective optical switch with a plurality of 1×2 optical switches with independent channel equalization capabilities for use in a wavelength division multiplexing (WDM) configurable add/drop multiplexer (COADM) and/or dynamic gain equalizer (DGE).

BACKGROUND OF THE INVENTION

In optical wavelength division multiplexed (WDM) communication systems, an optical waveguide simultaneously carries many different communication channels in light of different wavelengths. In WDM systems it is desirable to ensure that all channels have nearly equivalent power. To help achieve this, gain equalizers are disposed at various points throughout the system to control the relative power levels in respective channels.

Dense WDM systems require special add/drop multiplexers (ADM) to add and drop particular channels (i.e. wavelengths). For example, at predetermined nodes in the system, optical signals of predetermined wavelength are dropped from the optical waveguide and other signals of the same wavelength can then be added.

Typically, gain equalizing and add/drop multiplexer devices involve some form of multiplexing and demultiplexing to modify each individual channel of the telecommunication signal. In particular, it is common to provide a first diffraction grating for demultiplexing the optical signal and a second spatially separated diffraction grating for multiplexing the optical signal after it has been modified. An example of the latter is disclosed in U.S. Pat. No. 5,414,540, incorporated herein by reference. However, in such instances it is necessary to provide and accurately align two matching diffraction gratings and at least two matching lenses. This is a significant limitation of prior art devices.

To overcome this limitation, other prior art devices have opted to provide a single diffraction grating that is used to demultiplex an optical single in a first pass through the optics and multiplex the optical signal in a second pass through the optics. For example, U.S. Pat. Nos. 5,233,405, 5,526,155, 5,745,271, 5,936,752 and 5,960,133, which are incorporated herein by reference, disclose such devices.

However, none of these prior art devices disclose an optical arrangement suitable for both dynamic gain equalizer (DGE) and configurable optical add/drop multiplexer (COADM) applications. In particular, none of these prior art devices recognize the advantages of providing a simple, symmetrical optical arrangement suitable for use with various switching/attenuating means.

Moreover, none of the prior art devices disclose a multiplexing/demultiplexing optical arrangement that is compact and compatible with a plurality of parallel input/output optical waveguides.

For example, U.S. Pat. No. 5,414,540 to Patel et al. discloses a liquid crystal optical switch for switching an input optical signal to selected output channels. The switch includes a diffraction grating, a liquid crystal modulator, and a polarization dispersive element. In one embodiment, Patel et al. suggest extending the 1×2 switch to a 2×2 drop-add circuit and using a reflector. However, the disclosed device is limited in that the add/drop beams of light are angularly displaced relative to the input/output beams of light. This angular displacement is disadvantageous with respect to coupling the add/drop and/or input/output beams of light into parallel optical waveguides, in addition to the additional angular alignment required for the input beam of light.

With respect to compactness, prior art devices have been limited to an excessively long and linear configurations, wherein the input beam of light passes through each optical component sequentially before being reflected in a substantially backwards direction.

U.S. Pat. No. 6,081,331 discloses an optical device that uses a concave mirror for multiple reflections as an alternative to using two lenses or a double pass through one lens. However, the device disclosed therein only accommodates a single pass through the diffraction grating and does not realize the advantages of the instant invention.

An object of the present invention to provide an optical system including a diffraction grating that is relatively compact.

It is a further object of the instant invention to provide an optical configuration for rerouting and modifying an optical signal that can be used as a dynamic gain equalizer and/or configurable add/drop multiplexer.

SUMMARY OF THE INVENTION

Accordingly, the present invention relates to an optical device comprising:

a first port for launching an input beam of light including a plurality of wavelength channels;

a second port for receiving at least a portion of one of the plurality of wavelength channels;

first redirecting means for receiving the input beam of light, the first redirecting means having optical power;

a dispersive element for receiving the input beam of light from the first redirecting means, and for dispersing the input beam of light into the plurality of wavelength channels;

second redirecting means for receiving the dispersed wavelength channels, the second redirecting means having optical power; and a plurality of modifying means, each modifying means for receiving one of the dispersed wavelength channels along one of a first series of paths, and for reflecting at least a portion each wavelength channel back along one of the first series of paths or back along one of a second series of paths;

wherein each of said modifying means includes first adjustable phase biasing means positioned in the first series of paths, and a second adjustable phase biasing means positioned in each of the second series of paths;

wherein wavelength channels traveling back along the first series of paths exit the first port via the second redirecting means, the dispersive element and the first redirecting means; and wherein wavelength channels traveling back along the second series of paths exit the second port via the second redirecting means, the dispersive element and the first redirecting means.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
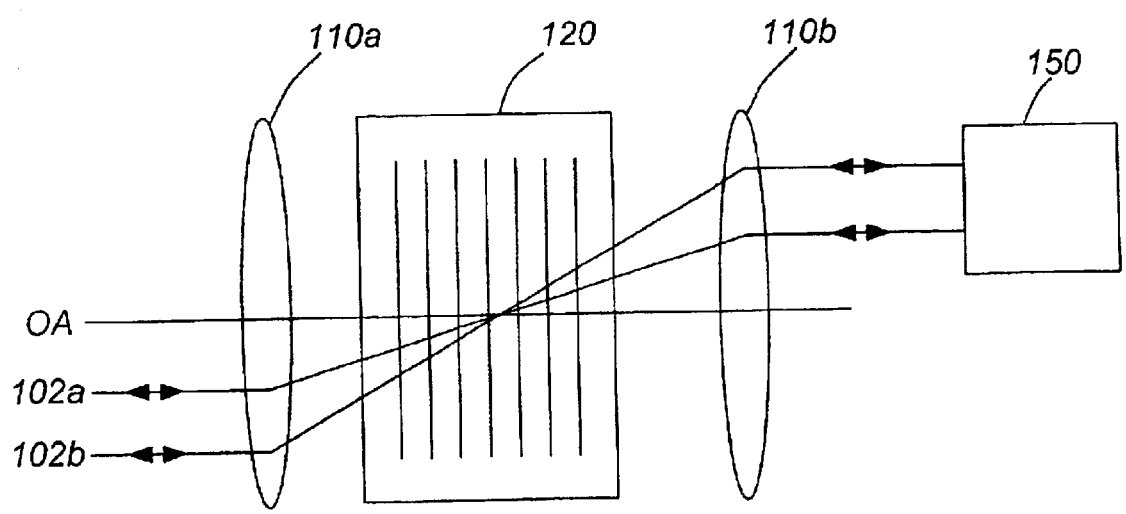
FIG. 1 is a schematic diagram illustrating an embodiment of an optical configuration that can be used as a dynamic gain equalizer and/or add-drop multiplexer (DGE/COADM) in accordance with the invention.

Referring now to FIG. 1, an optical device for rerouting and modifying an optical signal in accordance with the instant invention is capable of operating as a Dynamic Gain/Channel Equalizer (DGE) and/or a Configurable Optical Add/Drop Multiplexer (COADM).

The optical device of FIG. 1 includes a diffraction element 120 disposed between and at a focal plane of identical lens elements with optical power 110a and 110b. Two ports 102a and 102b are shown at an input/output end with bi-directional arrows indicating that light launched into port 102a can be transmitted through the optical device and can be reflected backward to the input port from which it was launched 102a, or alternatively, can be switched to port 102b or vice versa in a controlled manner. The input/output ports 102a and 102b are also disposed about one focal plane away from the lens element 110a to which they are optically coupled. Although only two input/output ports are shown to facilitate an understanding of this device, a plurality of such pairs of ports is optionally provided. At the other end of the device, a modifying means 150 is provided at the focal plane of the lens 110b for modifying at least a portion of the light incident thereon.

Figure 2A:
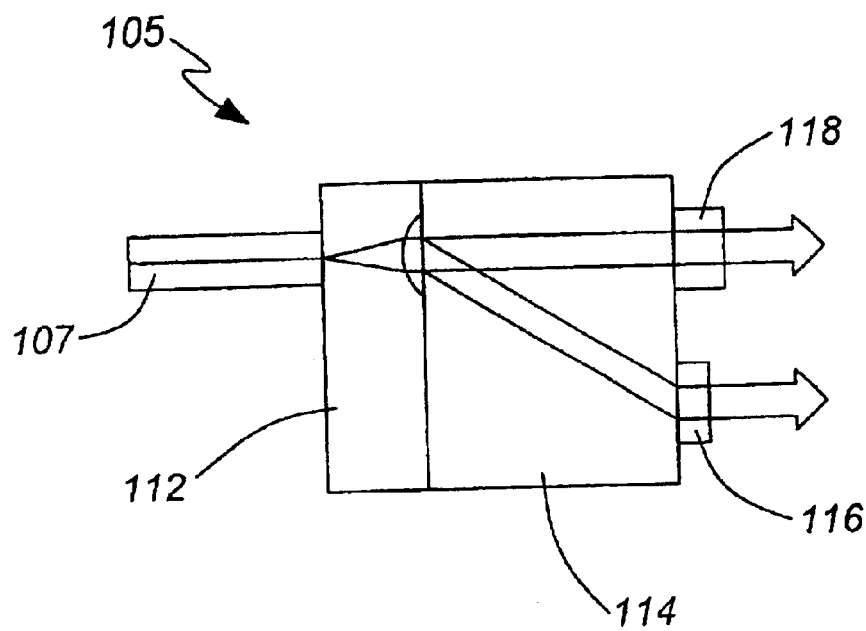
FIG. 2a is a detailed side view of a front-end module for use with the DGE/COADM shown in FIG. 1 having means for compensating for polarization mode dispersion (PMD)
Figure 2B:
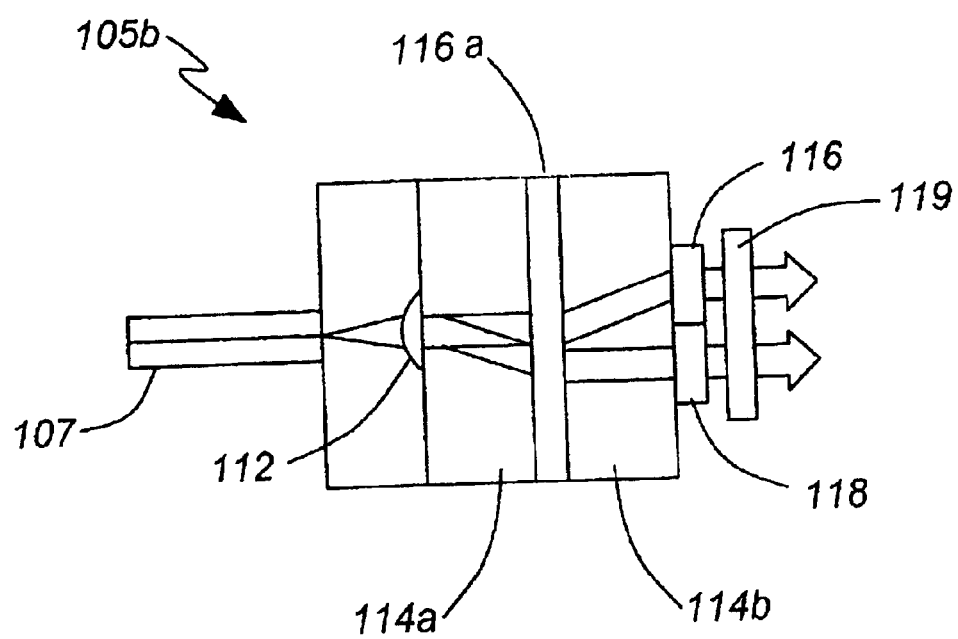
FIG. 2b is a detailed side view of an alternative front-end module having means for reducing or substantially eliminating PMD.

Since the modifying means and/or dispersive element are generally dependent upon polarization of the incident light beam, light having a known polarization state is provided to obtain the selected switching and/or attenuation. FIGS. 2a and 2b illustrate two different embodiments of polarization diversity arrangements for providing light having a known polarization state, for use with the DGE/COADM devices described herein. The polarization diversity arrangement, which is optionally an array, is optically coupled to the input and output ports.

Referring to FIG. 2a, an embodiment of a front-end micro-optical component 105 for providing light having a known polarization includes a fibre tube 107, a micro-lens 112, and a birefringent crystal element 114 for separating an input beam into two orthogonally polarized sub-beams. At an output end, a half waveplate 116 is provided to rotate the polarization of one of the beams by 90° so as to ensure both beams have a same polarization state, e.g. horizontal. A glass plate or a second waveplate 118 is added to the fast axis path of the crystal 114 to lessen the effects of Polarization Mode Dispersion (PMD) induced by the difference in optical path length along the two diverging paths of crystal 114.

FIG. 2b illustrates an alternative embodiment to that of FIG. 2a, wherein two birefringent elements 114a, 114b have a half waveplate 116a disposed therebetween; here an alternate scheme is used to make the path lengths through the birefringent materials substantially similar. Optionally, a third waveplate 119 is provided for further rotating the polarization state.

Although, FIGS. 2a and 2b both illustrate a single input beam of light for ease of understanding, the front end unit 105 is capable of carrying many more beams of light therethrough, in accordance with the instant invention (i.e., can be designed as an array as described above).

FIGS. 3a–3b, 3c–3d, 4a–4b, and 5, each illustrate a different embodiment of the modifying means for use with the DGE/COADM devices described herein. Each of these embodiments is described in more detail below. Note that the modifying means are generally discussed with reference to FIG. 1. Although reference is made to the dispersive element 120 and the lens elements 110a and 110b, these optical components have been omitted from FIGS. 3a–3b, 3c–3d, 4a–4b, and 5 for clarity.

Figure 3A:
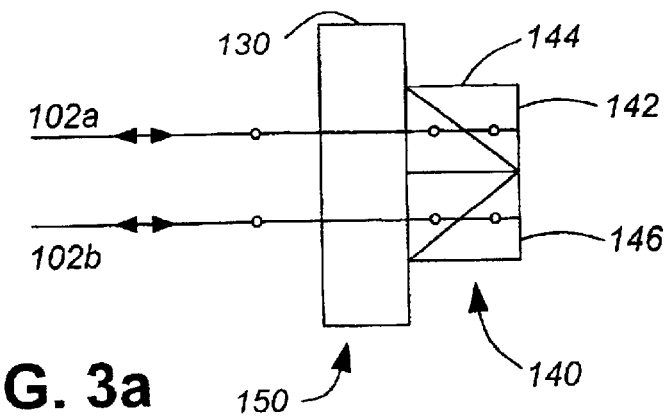
FIG. 3a is a top view of one embodiment of modifying means comprising a liquid crystal array for use with the DGE/COADM shown in FIG. 1, wherein a liquid crystal element is switched to an ON state.
Figure 3B:
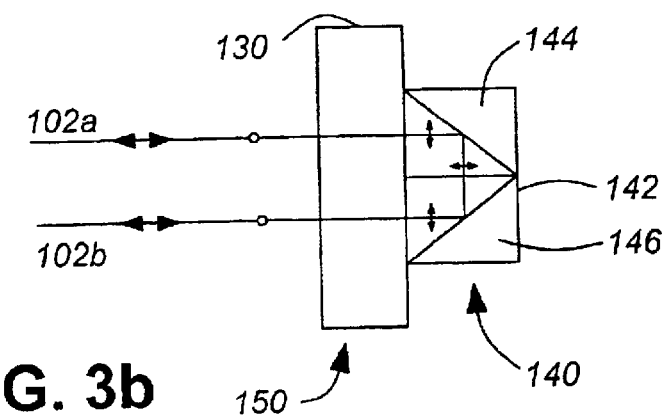
FIG. 3b is a top view of the modifying means shown in FIG. 3a, wherein the liquid crystal element is switched to an OFF state.

Referring to FIGS. 3a and 3b a schematic diagram of the modifying means 150 is shown including a liquid crystal array 130 and a reflector 140. The reflector includes first and second polarizing beam splitters 144 and 146, and a reflective surface 142.

When the device operates as a COADM, each pixel of the liquid crystal array 130 is switchable between a first state, e.g. an "ON" state shown in FIG. 3a, wherein the polarization of a beam of light passing therethrough is unchanged, e.g. remains horizontal, and a second state, e.g. an "OFF" state shown in FIG. 3b, wherein the liquid crystal cell rotates the polarization of a beam of light passing therethrough 90°, e.g. is switched to vertical. The reflector 140 is designed to pass light having a first polarization, e.g. horizontal, such that a beam of light launched from the port 102a is reflected back to the same port, and designed to reflect light having another polarization, e.g. vertical, such that a beam of light launched from the port 102a is switched to the port 102b.

When the device operates as a DGE, each liquid crystal cell is adjusted to provide phase retardations between 0° to 180°. For a beam of light launched and received from port 102a, 0% attenuation is achieved when liquid crystal cell provides no phase retardation, and 100% attenuation is achieved when the liquid crystal cell provides 180° phase retardation. Intermediate attenuation is achieved when the liquid crystal cells provide a phase retardation greater than 0° and less than 180°. In some DGE applications, the reflector 140 includes only a reflective surface 142, i. e. no beam splitter.

Preferably, the liquid crystal array 130 has at least one row of liquid crystal cells or pixels. For example, arrays comprising 64 or 128 independently controlled pixels have been found particularly practical, but more or fewer pixels are also possible. Preferably, the liquid crystal cells are of the twisted nematic type cells, since they typically have a very small residual birefringence in the "ON" state, and consequently allow a very high contrast ratio (>35 dB) to be obtained and maintained over the wavelength and temperature range of interest. It is also preferred that the inter-pixel areas of the liquid crystal array 130 are covered by a black grid.

Figure 3C:
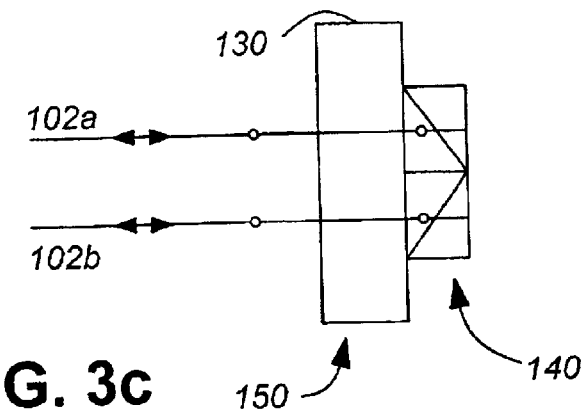
FIG. 3c is a top view of another embodiment of the modifying means for use with the DGE/COADM shown in FIG. 1, wherein the liquid crystal element is switched to an ON state.
Figure 3D:
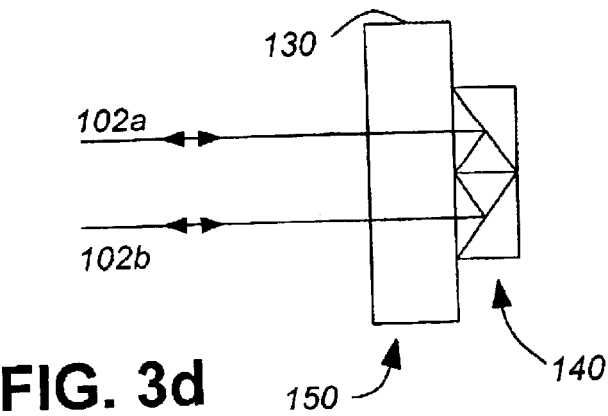
FIG. 3d is a top view of the modifying means shown in FIG. 3c, wherein the liquid crystal element is switched to an OFF state.

FIGS. 3c and 3d are schematic diagrams analogous to FIGS. 3a and 3b illustrating an alternate form of the modifying means 150 discussed above, wherein the reflector 140 includes a double Glan prism. The arrangement shown in FIGS. 3c and 3d is preferred over that illustrated in FIGS. 3a and 3b, since the respective positions of the two-sub beams emerging from the polarization diversity arrangement (not shown) does not change upon switching.

Note that in FIGS. 3a–3d the dispersion direction is perpendicular to the plane of the paper. For exemplary purposes a single ray of light is shown passing through the modifying means 150.

Figure 4A:
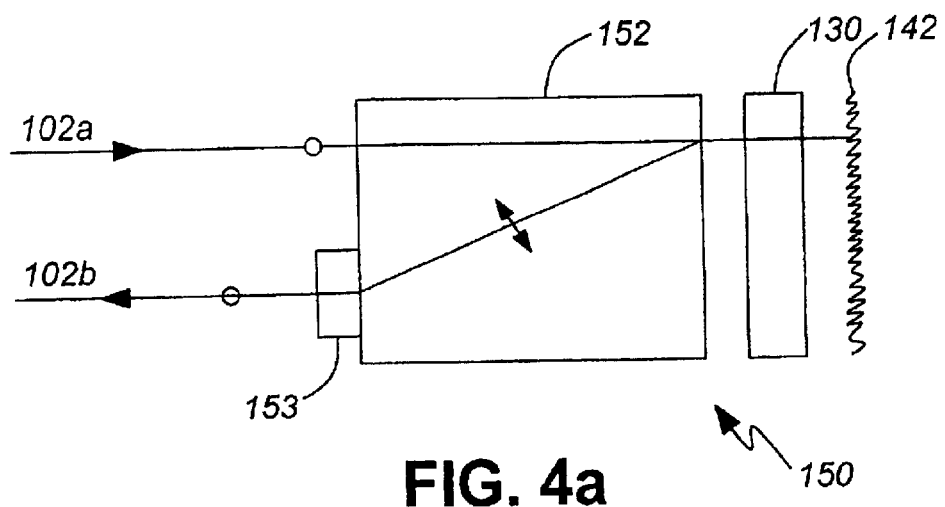
FIG. 4a is a top view of another embodiment of the modifying means for use with the DGE/COADM shown in FIG. 1 having a birefringent crystal positioned before the liquid crystal array, wherein the liquid crystal element is switched to an OFF state.
Figure 4B:
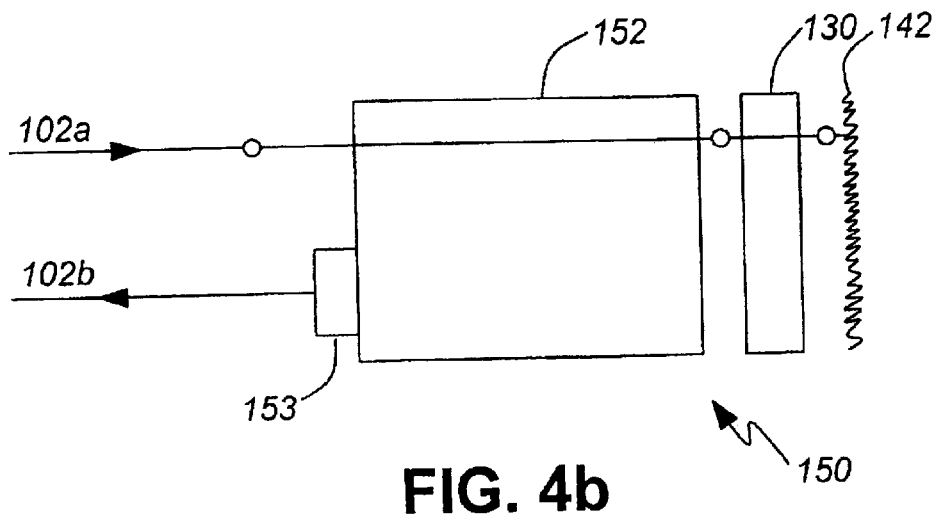
FIG. 4b is a top view of the modifying means shown in FIG. 4a, wherein the liquid crystal element is switched to an ON state.
Figure 4C:
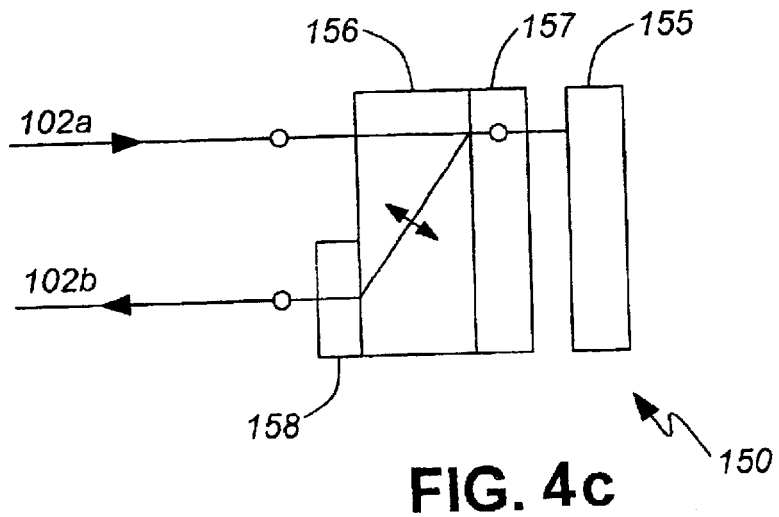
FIG. 4c is a top view of yet another embodiment of the modifying means for use with the DGE shown in FIG. 1 utilizing a MEMS device.

FIGS. 4a and 4b are schematic diagrams showing another embodiment of the modifying means 150, wherein a birefringent crystal 152 is disposed before the liquid crystal array 130. A beam of light having a predetermined polarization state launched from port 102a is dispersed into sub-beams, which are passed through the birefringent crystal 152. The sub-beams of light passing through the birefringent crystal 152 remain unchanged with respect to polarization. The sub-beams of light are transmitted through the liquid crystal array 130, where they are selectively modified, and reflected back to the birefringent crystal 152 via reflective surface 142. If a particular sub-beam of light passes through a liquid crystal cell in an "OFF" state, as shown in FIG. 4a, then the polarization thereof will be rotated by 90° and the sub-beam of light will be refracted as it propagates through the birefringent crystal 152 before being transmitted to port 102b. If the sub-beam of light passes through a liquid crystal cell in an "ON" state, as shown in FIG. 4b, then the polarization thereof will not be rotated and the sub-beam of light will be transmitted directly back to port 102a. A half wave plate 153 is provided to rotate the polarization of the refracted sub-beams of light by 90° to ensure that both reflected beams of light have a same polarization state.

FIG. 5 is a schematic diagram of another embodiment of the modifying means 150 including a micro electro-mechanical switch (MEMS) 155, which is particularly useful when the device is used as a DGE. A beam of light having a predetermined polarization state launched from port 102a is dispersed into sub-beams and is passed through a birefringent element 156 and quarter waveplate 157. The birefringent element 156 is arranged not to affect the polarization of the sub-beam of light. After passing through the quarter waveplate 157, the beam of light becomes circularly polarized and is incident on a predetermined reflector of the MEMS array 155. The reflector reflects the sub-beam of light incident thereon back to the quarter waveplate. The degree of attenuation is based on the degree of deflection provided by the reflector (i.e. the angle of reflection). After passing through the quarter waveplate 157 for a second time, the attenuated sub-beam of light will have a polarization state that has been rotated 90° from the original polarization state. As a result the attenuated sub-beam is refracted in the birefringent element 156 and is directed out of the device to port 102b. A half wave plate 158 is provided to rotate the polarization of the refracted sub-beams of light by 90°.

Of course, other modifying means 150 including at least one optical element capable of modifying a property of at least a portion of a beam of light and reflecting the modified beam of light back in substantially the same direction from which it originated are possible.

Advantageously, each of the modifying means discussed above utilizes an arrangement wherein each spatially dispersed beam of light is incident thereon and reflected therefrom at a 90° angle. The 90° angle is measured with respect to a plane encompassing the array of modifying elements (e.g. liquid crystal cells, MEMS reflectors).

Accordingly, each sub-beam of light follows a first optical path to the modifying means where it is selectively switched such that it is reflected back along the same optical path, or alternatively, along a second optical path parallel to the first. The lateral displacement of the input and modified output beams of light (i.e., as opposed to angular displacement) allows for highly efficient coupling between a plurality of input/output waveguides. For example, the instant invention is particular useful when the input and output ports are located on a same multiple bore tube, ribbon, or block.

In order to maintain the desired simplicity and symmetry, it is preferred that the element having optical power be rotationally symmetric, for example a rotationally symmetric lens or spherical reflector. Moreover, it is preferred that the diffraction element 120 be a high efficiency, high dispersion diffraction grating. Optionally, a circulator (not shown) is optically coupled to each of ports 102a and 102b for separating input/output and/or add/drop signals.

Referring again to FIG. 1, the operation of the optical device operating as a COADM is described by way of the following example. A collimated beam of light having a predetermined polarization and carrying wavelengths $\lambda_1$, $\lambda_2$, ... $\lambda_8$ is launched through port 102a to a lower region of lens 110a and is redirected to the diffraction grating 120. The beam of light is spatially dispersed (i.e. de-multiplexed) according to wavelength in a direction perpendicular to the plane of the paper. The spatially dispersed beam of light is transmitted as 8 sub-beams of light corresponding to 8 different spectral channels having central wavelengths $\lambda_1$, $\lambda_2$, ... $\lambda_8$ through lens 110b, where it is collimated and incident on the modifying means 150, which for exemplary purposes is shown in FIG. 3a–3b. Each sub-beam of light is passed through an independently controlled pixel in the liquid crystal array 130. In particular, the sub-beam of light having central wavelength $\lambda_3$ passes through a liquid crystal cell in an "OFF" state, and each of the other 7 channels having central wavelengths $\lambda_1$–$\lambda_2$ and $\lambda_4$–$\lambda_8$ pass through liquid crystal cells in an "ON" state. As the sub-beam of light having central wavelength $\lambda_3$ passes through the liquid crystal in the "OFF" state, the polarization thereof is rotated 90°, it is reflected by the polarization beam splitter 144 towards a second beam splitter 146, and is reflected back to port 102b, as shown in FIG. 3b. As the other 7 channels having central wavelengths $\lambda_1$–$\lambda_2$ and $\lambda_4$–$\lambda_8$ pass through liquid crystal cells is in an "ON" state, the polarizations thereof remain unchanged, and they are transmitted through the polarization beam splitter 144 and are reflected off reflective surface 142 back to port 102a. In summary, the beam of light originally launched from port 102a will return thereto having dropped a channel (i.e. having central wavelength $\lambda_3$) and the sub-beam of light corresponding to the channel having central wavelength $\lambda_3$ will be switched to port 102b.

Simultaneously, a second beam of light having a predetermined polarization and carrying another optical signal having a central wavelength $\lambda_3$ is launched from port 102b to a lower region of lens 110a. It is reflected from the diffraction grating 120, and is transmitted through lens 110b, where it is collimated and incident on the modifying means 150. The second beam of light passes through the liquid crystal cell in the "OFF" state, the polarization thereof is rotated 90°, it is reflected by the second polarization beam splitter 146 towards the first beam splitter 144, and is reflected back to port 102a, as shown in FIG. 3b. Notably, the 7 express channels and the added channel are multiplexed when they return via the dispersion grating 120.

Since every spectral channel is passed through an independently controlled pixel before being reflected back along one of the two possible optical paths, a fully re-configurable switch for a plurality of channels is obtained.

Notably, the choice of eight channels is arbitrarily chosen for exemplary purposes. More or fewer channels are also within the scope of the instant invention.

With reference to FIGS. 5a to 5h, an improved means for modifying the individual wavelength channels includes first adjustable phase biasing means in the form of a first array of liquid crystal elements 201 (one shown), a polarization beam splitter 202, and second adjustable phase biasing means in the form of a second array of liquid crystal elements 203 (one shown). The polarization beam splitter 202 includes first and second triangular prisms 204 and 205 with a first polarization beam splitting coating 207 therebetween. The coating 207 passes light with a first polarization, while reflecting light of a second orthogonal polarization along a path perpendicular to the original path. Third and fourth triangular prisms 208 and 209 with a second polarization beam splitting coating 211 therebetween complete the assembly of the polarization beam splitter 202. The second coating 211 reflects light with the second polarization back along a path, which is parallel to the original path.

Figure 5A:
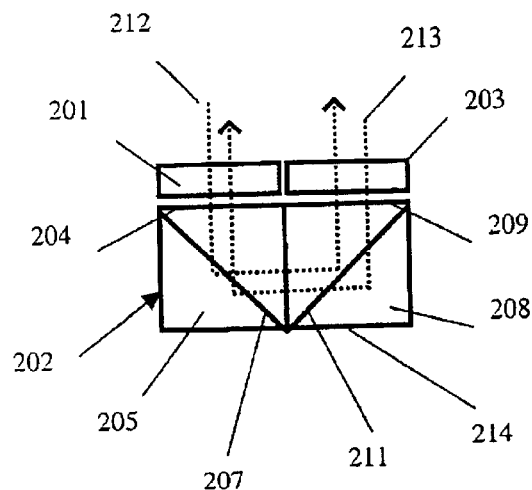
FIGS. 5a to 5h illustrate an improved modifying means including two arrays of liquid crystal elements.
Figure 5B:
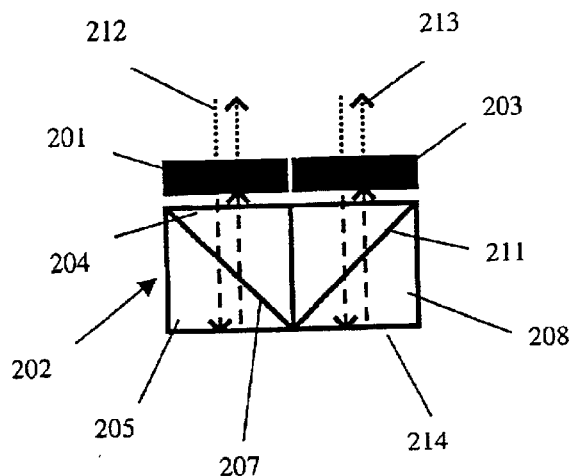
Figure 5C:
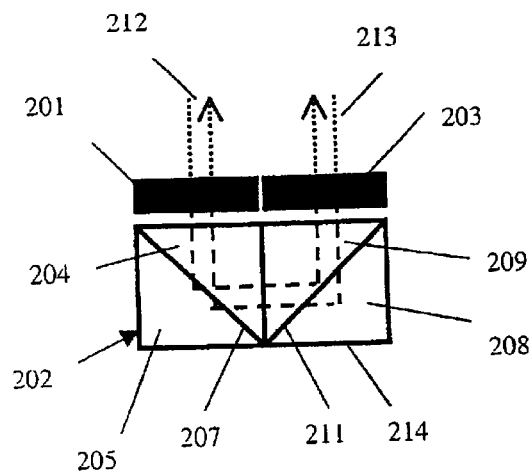

FIGS. 5a to 5d illustrate the use of the improved modifying means to perform the same function as the modifying means of FIGS. 3a and 3b by setting both the first and the second arrays of liquid crystal elements 201 and 202 to the ON or OFF setting. FIGS. 5a and 5c perform the same function, but in a slightly different manner. In FIG. 5a, the first and second liquid crystal elements are set to OFF, and the polarizations of an input channel 212 and an add channel 213 are unaffected. In this case the polarization beam splitting coatings 207 and 211 reflect light of the first polarization (dotted line), so that a channel originating on one of a first set of paths from the dispersive element 120 is redirected along one of a second set of paths back to the dispersive element 120 via the second redirecting means 110b, and vice versa. FIG. 5b simply illustrates what happens if both of the first and second liquid crystal elements are set to ON, i.e. the polarizations of the wavelength channels 212 and 213 are rotated to the second polarization (dashed line). In this case the wavelength channels 212 and 213 are passed through the coatings 207 and 211, respectively, and reflect off a reflective surface 215 back along the same paths.

Figure 5D:
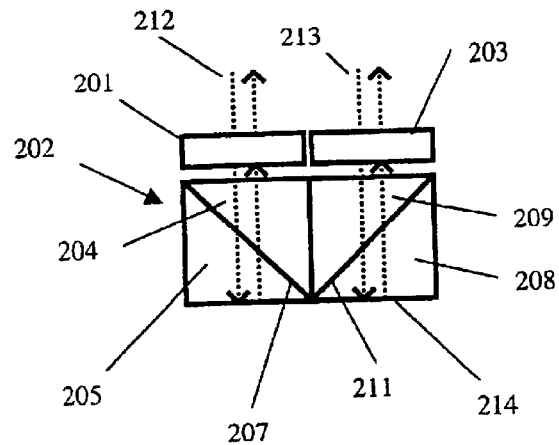

In FIG. 5c both of the liquid crystal elements 201 and 203 are set to ON, and the polarizations of the input and add channels 212 and 213, respectively, are rotated by 90° to a second polarization (dashed line). However, in this case the polarization beam splitting coatings 207 and 211 reflect the second polarization, so that the wavelength channels 212 and 213 get reflected through both of the liquid crystal elements 201 and 203. The polarization of the wavelength channels 212 and 213 are then rotated back to the first polarization (dotted line) by the second and the first liquid crystal elements 203 and 201, respectively, for transmission through the device. FIG. 5d illustrates the case when the liquid crystal elements 201 and 203 are OFF, and the polarization beam splitting coatings 207 and 211 pass light with the first polarization (dotted line).

Figure 5E:
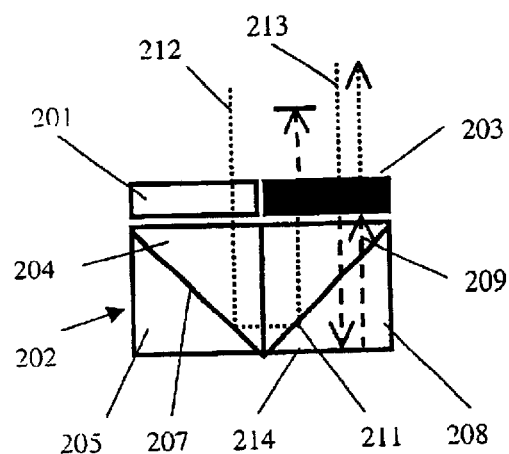
Figure 5F:
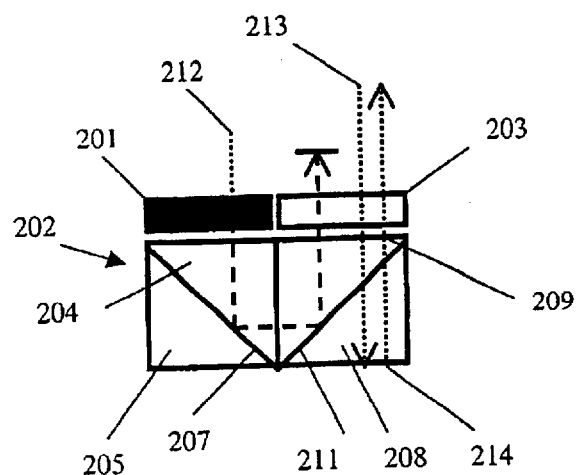

FIGS. 5e and 5f illustrate how the improved modifying means can be used as a wavelength blocker. To block input channel 212, the first liquid crystal element 201 is turned OFF, and the polarization beam splitting coatings 207 and 211 reflect light having the first polarization. If the second liquid crystal element 203 is turned ON, then the polarization of the input channel 212 is rotated to the second polarization (dashed line). However, the optics used to polarize the light (FIGS. 2a and 2b), as well as the dispersive element 120 only work on light having the first polarization (dotted line). Accordingly, light exiting the modifying means with the second polarization gets spilled off, i.e. attenuated by as much as 50 dB. Alternatively, as illustrated in FIG. 5f, if the polarization of the input channel 212 is originally rotated by the first liquid crystal element 201, and the polarization beam splitting coatings 207 and 211 reflect light with the second polarization (dashed line), the same blocking function will take place. In either case, if an add channel 213 is launched, it simply reflects off the reflective surface 214, and returns along one of the paths in the second series of paths.

Figure 5G:
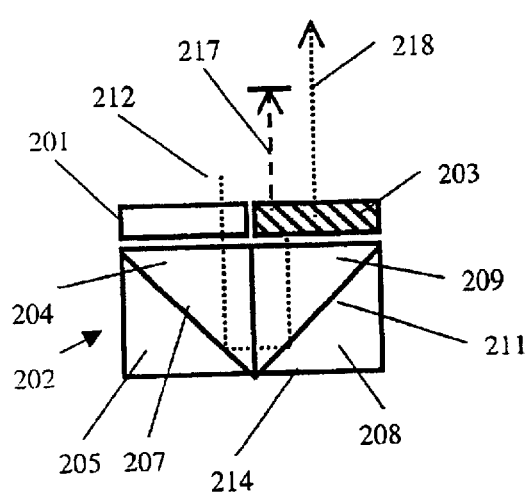
Figure 5H:
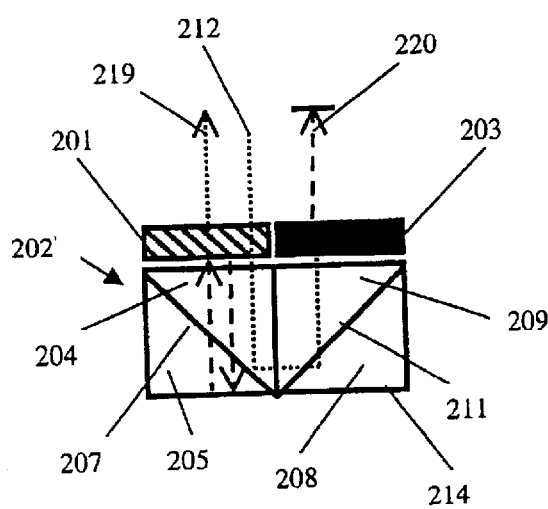

FIGS. 5g and 5h illustrate how the improved modifying means is used as in dynamic gain equalization. In FIG. 5g, the input channel 212 passes through the first liquid crystal element 201, and gets reflected by the polarization beam splitter 202 to the second liquid crystal element 203. The second liquid crystal element 203 is set to partially rotated the polarization of the input channel 212, so that a portion 218 thereof remains the first polarization (dotted line), while the remainder 217 thereof changes polarization (dashed line) and is effectively blocked out. In this example, the input channel is switched to the second set of paths and therefore exits the second port.

FIG. 5h illustrates the case in which the light is attenuated, and returns along one of the first set of paths to the first port. Accordingly, the first liquid crystal element 201 is set to partially rotate the polarization of the input channel 212. As a result, a portion 219 (dashed line) of the input channel 212 is passed through the polarization beam splitting coating 207, and gets reflected back by the reflective surface 214 along the same path. The remainder 220 of the light with the first polarization (dotted line) gets reflected by the polarization beam splitter 202 to the second liquid crystal element 203. The second liquid crystal element 203 rotates the polarization of the remainder 220 of the light to the second polarization (dashed line), which, as detailed above, gets spilled off and attenuated.

Referring again to FIG. 1, the operation of the optical device operating as a DGE is described by way of the following example. A collimated beam of light having a predetermined polarization and carrying channels $\lambda_1, \lambda_2, \ldots \lambda_8$ is launched from port 102a through lens 110a, where it is redirected to diffraction grating 120. The beam of light is spatially dispersed according to wavelength in a direction perpendicular to the plane of the paper. The spatially dispersed beam of light is transmitted as 8 sub-beams of light corresponding to 8 different spectral channels having central wavelengths $\lambda_1, \lambda_2, \ldots \lambda_8$ through lens 110b, where it is collimated and incident on the modifying means 150 such that each sub-beam of light is passed through an independently controlled pixel in the liquid crystal array 130 wherein the polarization of each sub-beam of light is selectively adjusted. In particular, the sub-beam of light having central wavelength $\lambda_3$ is passed through a liquid crystal cell in an "ON" state, the polarization thereof is not adjusted, it passes through the beam splitter 144, and is reflected back to port 102a with no attenuation, as illustrated in FIG. 3a. Simultaneously, a sub-beam of light having central wavelength $\lambda_4$ is passed through a liquid crystal cell in an "OFF" state, the polarization thereof is rotated by 90°, it is reflected from beam splitters 144 and 146 and is directed to port 102b. 100% attenuation is achieved with respect to this sub-beam of light returning to port 102a. Simultaneously, a sub-beam of light having central wavelength $\lambda_5$ is passed through a liquid crystal cell that provides phase retardation between 0° and 180°, it is partially transmitted through from beam splitter 144 and returns to port 102a an attenuated signal. The degree of attenuation is dependent upon the phase retardation.

Optionally, a second beam of light is simultaneously launched from port 102b into the optical device for appropriate attenuation. In fact, this optical arrangement provides a single optical system that is capable of providing simultaneous attenuation for a plurality of input ports (not shown).

Alternatively, the attenuated light is received from port 102b, hence obviating the need for a circulator. In this instance, when the polarization of a beam of light having central wavelength $\lambda_3$ is rotated by 90°, i.e. the liquid crystal array provides 180° phase retardation, it is reflected from the beam splitter 144 to the second beam splitter 146 (shown in FIG. 3a) and is directed to port 102b with no attenuation. Similarly, when the polarization of this beam of light is not adjusted, i.e. the liquid crystal array provides no phase retardation, it passes through the beam splitter 144 (shown in FIG. 3a) and is reflected back to port 102a. 100% attenuation with respect to this sub-beam of light reaching port 102b is achieved. Variable attenuation is achieved when the liquid crystal cell selectively provides phase retardation between 0° and 180°.

Figure 6A:
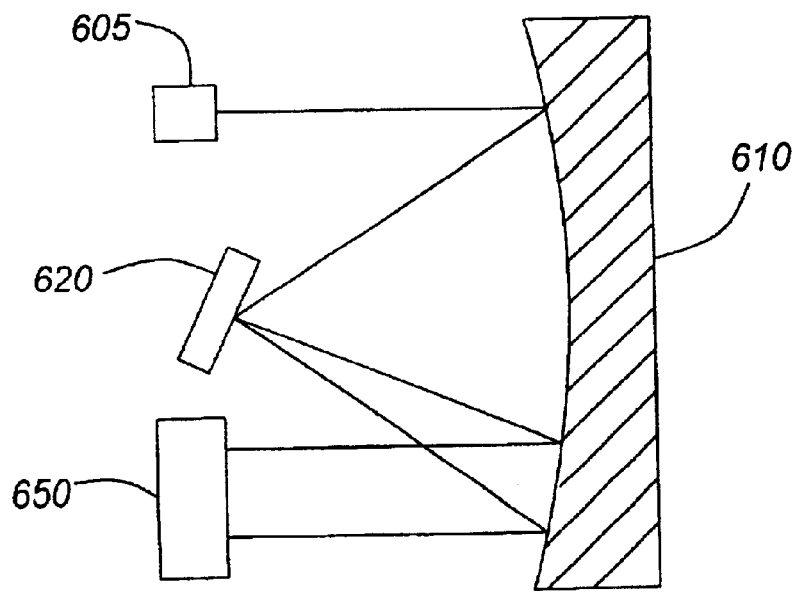
FIGS. 6a and 6b are schematic diagrams of an embodiment of the invention that is preferred over the one shown in FIG. 1, wherein the focal plane of a single spherical reflector is used to locate the input/output ports, diffraction grating, and modifying means.

Turning now to FIG. 6a another embodiment of the DGE/COADM, which is preferred over the embodiment shown in FIG. 1, is shown. For clarity only one beam is shown exiting the front-end unit 605, however at least one other beam (not shown) is disposed behind this beam as is evident in the isometric view illustrated in FIG. 6b.

In FIG. 6a a single element having optical power in the form of a spherical reflector 610 is used to receive a collimated beam of light from the front-end unit 605 and to receive and reflect beams of light to and from the diffraction grating 620 and the modifying means 650. The front-end unit 605, the diffraction grating 620, and the modifying means 650, are analagous to parts 105, 120, and 150 described above. However, in this embodiment the front-end unit 605, the diffraction grating 620, and the modifying means are each disposed about the single focal plane of the spherical reflector 610. Preferably, the diffraction grating is further disposed about the optical axis of the spherical reflector 610. In general, two circulators (not shown) are optically coupled to the front-end unit 605 to separate input/out and add/drop signals in ports 102a and 102b, as described above.

Figure 6B:
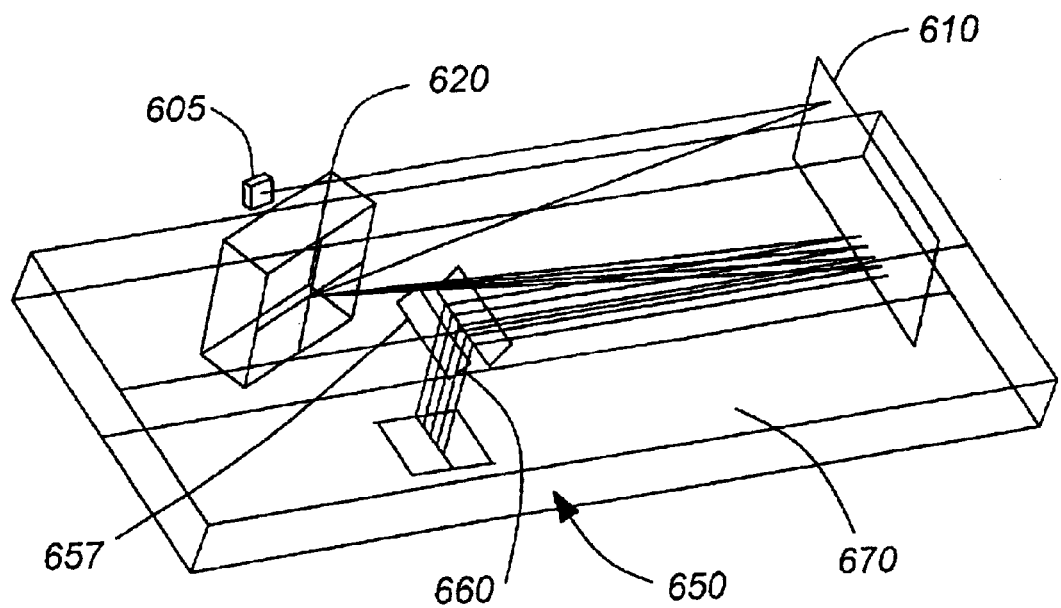

Preferably, the diffraction grating 620, the spherical reflector 640, and the modifying means 650 are each made of fused silica and mounted together with a beam folding mirror or prism 660 to a supporting plate 670 made of the same, as illustrated in FIG. 6b. The beam folding mirror or prism 660 is provided for space considerations. Advantageously, this design provides stability with respect to small temperature fluctuations. Moreover, this design is defocus free since the radius of curvature of the spherical reflector 610 changes in proportion to thermal expansion or contraction of any other linear dimensions. Advantageously, the spherical mirror 610 has substantially no chromatic aberrations.

When the optical device operates as a DGE, a detector array 657 is optionally positioned behind the beam-folding mirror 660 to intercept part of the wavelength dispersed beam of light. This design allows the signal to be tapped while eliminating the need for external feedback.

Preferably, the diffraction grating 620 and the modifying means 650 are disposed substantially one focal length away from the spherical mirror 610 or substantially at the focal plane of the spherical reflector 610, as discussed above. For example, in COADM applications it is preferred that the modifying means 650 are substantially at the focal plane to within 10% of the focal length. For DGE applications, it is preferred that the modifying means 650 are substantially at the focal plane to within 10% of the focal length if a higher spectral resolution is required, however, the same accuracy is not necessary for lower resolution applications.

In operation, a multiplexed beam of light is launched into the front-end unit 605. The polarization diversity arrangement 105 provides two substantially collimated sub-beams of light having the same polarization, e.g. horizontal, as discussed above. The two beams of light are transmitted to the spherical reflector 610 and are reflected therefrom towards the diffraction grating 620. The diffraction grating 620 separates each of the two sub-beams into a plurality of sub-beams of light having different central wavelengths. The plurality of sub-beams of light are transmitted to the spherical reflector 610 where they are collimated and transmitted to the modifying means 150 where they are incident thereon as spatially separated spots corresponding to individual spectral channels. Each sub-beam of light corresponding to an individual spectral channel is modified and reflected backwards either along the same optical path or another optical path according to its polarization state, as described above. The sub-beams of light are transmitted back to the spherical reflector 610 and are redirected to the dispersive element, where they are recombined and transmitted back to the spherical element to be transmitted to the predetermined input/output port.

Optionally, second, third, forth, . . . etc. multiplexed beams of light are launched into the front-end unit 605. In fact, this optical arrangement is particularly useful for applications requiring the manipulation of two bands, e.g. C and L bands, simultaneously, wherein each band has its own corresponding in/out/add/drop ports.

Advantageously, the optical arrangement shown in FIGS. 6a and 6b provides a symmetrical 4-$f$ optical system with fewer alignment problems and less loss than prior art systems. In fact, many of the advantages of this design versus a conventional 4$f$ system using separate lenses is afforded due to the fact that the critical matching of components is obviated. One significant advantage relates to the fact that the angle of incidence on the grating, in the first and second pass, is inherently matched with the optical arrangement.

The instant invention further provides an optical device for rerouting and modifying an optical signal device that is substantially more compact and that uses substantially fewer components than similar prior art devices.

Figure 7:
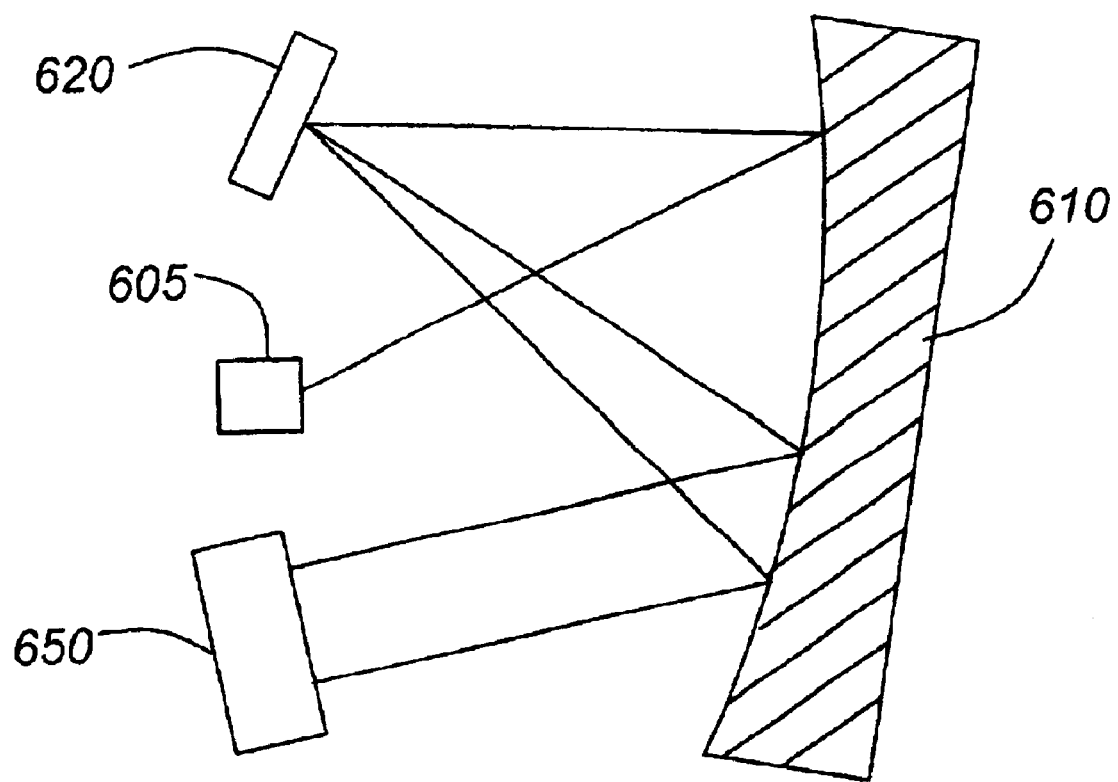
FIG. 7 is a schematic diagram of an embodiment of the invention that is similar to that shown in FIGS. 6a and 6b, wherein the input/output ports are disposed between the modifying means and dispersive element.

FIG. 7 shows an alternate arrangement of FIG. 6a and FIG. 6b that is particularly compact. In this embodiment, the more bulky dispersive element 620 and modifying means 650 are disposed outwardly from the narrower front-end unit 605.

Figure 8:
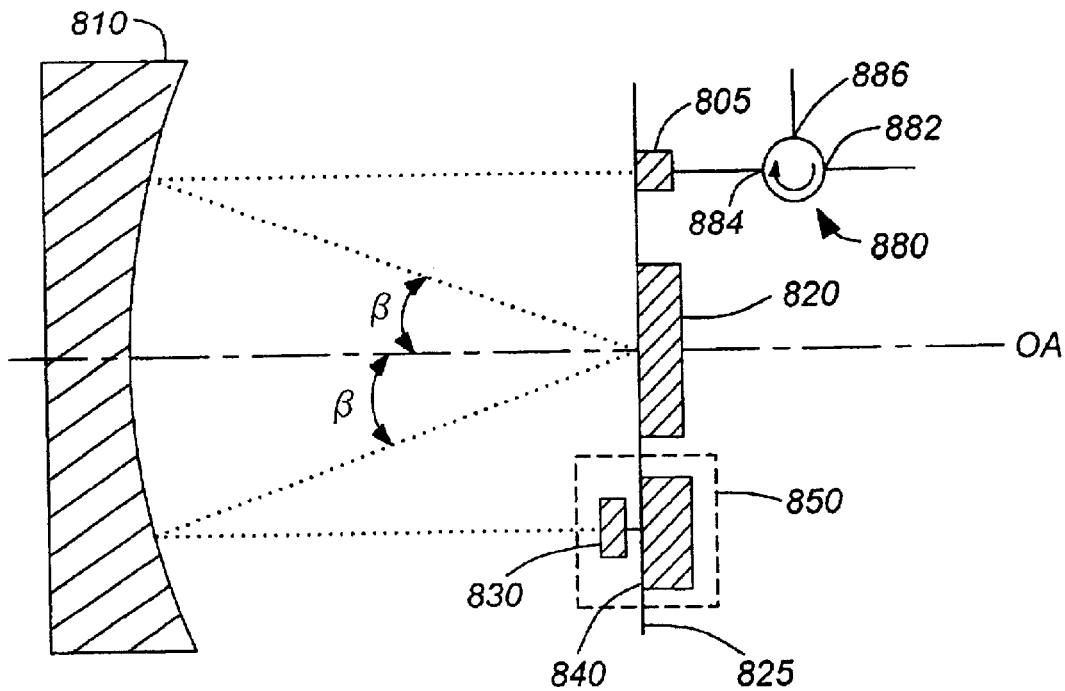
FIG. 8 is a schematic diagram of a DGE having a configuration similar to that shown in FIGS. 6a and 6b including an optical circulator.

FIG. 8 illustrates a DGE including a conventional three port optical circulator and having a particularly symmetrical design. A beam of light is launched into a first port 882 of the circulator 880 where it circulates to and exits through port 884. The beam of light exiting port 884 is passed through the front-end unit 805, which produces two collimated sub-beams having a same polarization that are transmitted to an upper region of the spherical reflector 810 in a direction parallel to an optical axis OA thereof. The collimated sub-beams of light incident on the spherical reflector 810 are reflected and redirected to the diffraction grating 820 with an angle of incidence β. The sub-beams of light are spatially dispersed according to wavelength and are transmitted to a lower region of the spherical reflector 810. The spatially dispersed sub-beams of light incident on the lower region of the spherical reflector 810 are reflected and transmitted to the modifying means 850 in a direction parallel to the optical axis of the spherical reflector 810. Once attenuated, the sub-beams of light are reflected back to the spherical reflector 810, the diffraction grating 820, and the front-end unit 805 along the same optical path. The diffraction grating recombines the two spatially dispersed sub-beams of light. The front-end unit 805 recombines the two sub-beams of light into a single beam of light, which is transmitted to the circulator 880 where it is circulated to output port 860. The front-end unit 805, diffraction grating 820, and modifying means 850, which are similar to components 105, 120, and 150 described above, are each disposed about a focal plane 825 of the spherical reflector 810. In particular, the diffraction grating 820 is disposed about the focal point of the spherical reflector 810 and the modifying means 850 and front-end unit are symmetrically disposed about the diffraction grating. Preferably, the modifying means 850 includes either a liquid crystal array 830 and a flat reflector 840, or a MEMS array (not shown).

Notably, an important aspect of the optical design described heretofore relates to the symmetry and placement of the optical components. In particular, the fact that each of the front-end unit, the element having optical power, the dispersive element, and the modifying means are disposed about one focal length (of the element having optical power) away from each other is particularly advantageous with respect to the approximately Gaussian nature of the incident beam of light.

Referring again to FIG. 8, the input beam of light emerges from the front-end unit 805 essentially collimated and is transmitted via the element having optical power 810 to the diffraction grating 820. Since the diffraction grating 820 is located at the focus of the element having optical power 810 and the input beams are collimated, the light is essentially focused on the diffraction grating 820, as discussed above. The $1/e^2$ spot size at the grating, $2\omega_1$, and the $1/e^2$ diameter $2\omega_2$ at the front-end unit 805, are related by:

$$\omega_1 * \omega_2 = \lambda * f/\pi$$

where λ is wavelength and f is the focal length of the element having optical power. Accordingly, one skilled in the art can tune the spot size on the diffraction grating 820 and the resulting spectral resolution by changing the beam size at the front-end unit 805.

Moreover, the instant invention allows light beams launched from the front-end unit 805 to propagate to the liquid crystal array 830 with little or no spot expansion, since by symmetry, the spot size at the liquid crystal array is the same as the spot size at the front-end unit. Accordingly, the size of a beam of light launched from the front-end unit 805 can be changed to conform to the cell size of the liquid crystal array and/or vice versa. Alternatively, the size of the beam of light can be adjusted to change the spot size on the grating element 820, as discussed above. Obviously, the same tuning is achievable with the optical arrangements shown in both FIG. 1 and FIGS. 6a, 6b.

Figure 9:
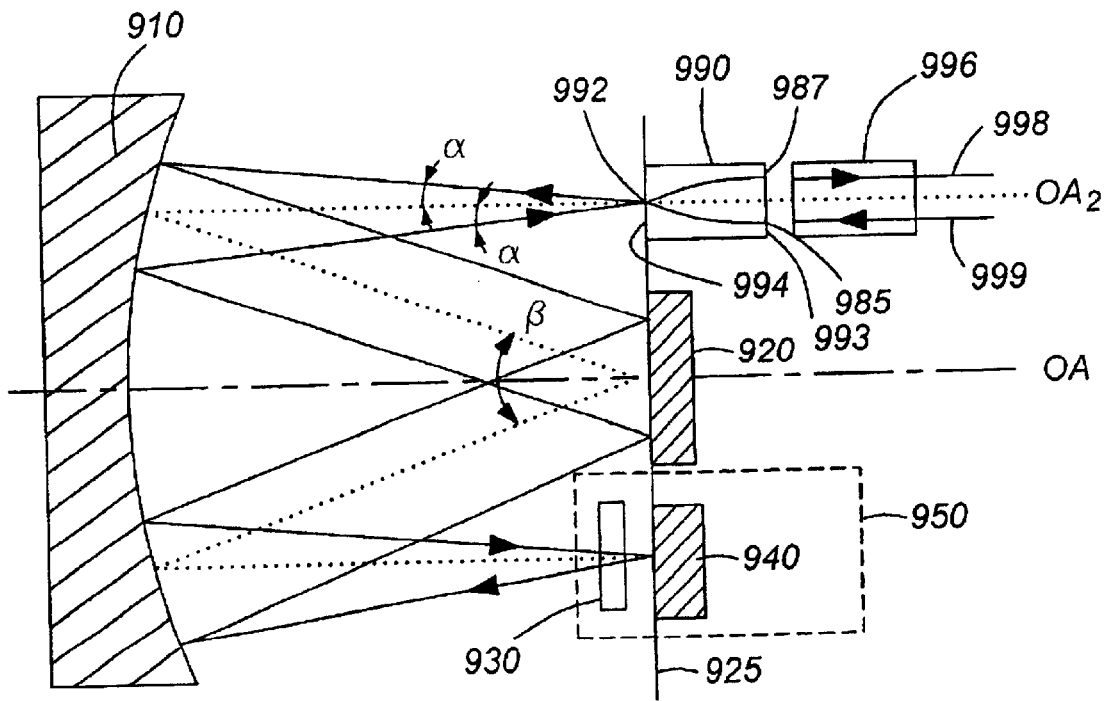
FIG. 9 is a schematic diagram of a DGE/COADM in accordance with the instant invention including a lens having a single port for launching and receiving light from the spherical reflector.

FIG. 9 illustrates an embodiment in accordance with the instant invention, wherein a single collimating/focusing lens 990 replaces the optical circulator 884 in the DGE shown in FIG. 8. Preferably, the lens 990 is a collimating/focusing lens such as a Graded Index or GRIN lens. The GRIN lens 990 is disposed such that an end face 994 thereof is coincident with the focal plane 925 of the spherical reflector 910. The GRIN lens 990 is orientated such that its optical axis ($OA_2$) is parallel to but not coaxial with the optical axis OA of the spherical reflector 990. An input 985 and an output 987 port are disposed about an opposite end face 993 of the lens 990, off the optical axis $OA_2$, and are optically coupled to input 999 and output 998 optical waveguides, respectively. Preferably, input 999 and output 998 waveguides are optical fibres supported by a double fibre tube, such as a double bore tube or a double v-groove tube. A single input/output port 992 is disposed about end face 994 coincident with the optical axis $OA_2$. The modifying means 950 are shown including a liquid crystal array 930 and a flat mirror 940 perpendicular to the OA of the spherical reflector 910. Alternatively, the modifying means comprises a pair of liquid crystal arrays, one in the incident path and one in the reflected path. Furthermore, a MEMS array (not shown) can replace the flat mirror 940 to enable individual channel control. All other optical components are similar to those described with reference to FIG. 8.

In operation, a beam of light is launched from input waveguide 999 into port 985 in a direction substantially parallel to the optical axis ($OA_2$) of the lens 990. The beam of light passes through the GRIN lens 990, and emerges from port 992 at an angle α to the optical axis. The angle α is dependent upon the displacement of port 985 from the optical axis ($OA_2$), d. The beam of light is transmitted to an upper end of the spherical reflector 910, where it is directed to the diffraction grating 920 with an angle of incidence β. The resulting spatially dispersed beam of light is transmitted to the spherical reflector, is reflected, and is transmitted to the modifying means 950. If the diffraction grating 920 is parallel to the focal plane 925, as shown in FIG. 9, the beam of light incident on the modifying means has an angle of incidence substantially close to α. Each sub-beam of the spatially dispersed beam of light is selectively reflected back to the spherical reflector 910 at a predetermined angle, generally along a different optical path from which it came. Variable attenuation is provided by the modifying means 950. The spherical reflector 910 redirects the modified spatially dispersed beam of light back to the diffraction grating 920 such that it is recombined to form a single modified output beam of light, which is incident on the single port 992 with an angle of incidence close to −α. The attenuated output beam of light is passed through the lens 990, and is directed towards output port 987 where it is transmitted to output optical fibre 998.

Advantageously, this simple device, which allows light to enter and exit through two different ports disposed at one end of the device, is simple, compact, and easy to manufacture relative to prior art modifying and rerouting devices.

Moreover, the instant design obviates the need for a bulky and costly optical circulator, while simultaneously providing an additional degree of freedom to adjust the mode size, which in part defines the resolution of the device, i.e. can adjust the focal length of GRIN lens 990.

Preferably, light transmitted to and from the output 998 and input 999 optical waveguides is focused/collimated, e.g. through the use of micro-collimators, thermally expanded core fibers, or lens fibers. Optionally, a front-end unit, e.g. as shown in FIGS. 2a or 2b, which is in the form of an array, couples input/output waveguides 999/998 to end face 993. FIGS. 9a–9d illustrate various optical input arrangements, which for exemplary purposes are illustrated with the arrangement shown in FIG. 2a.

Figure 9A:
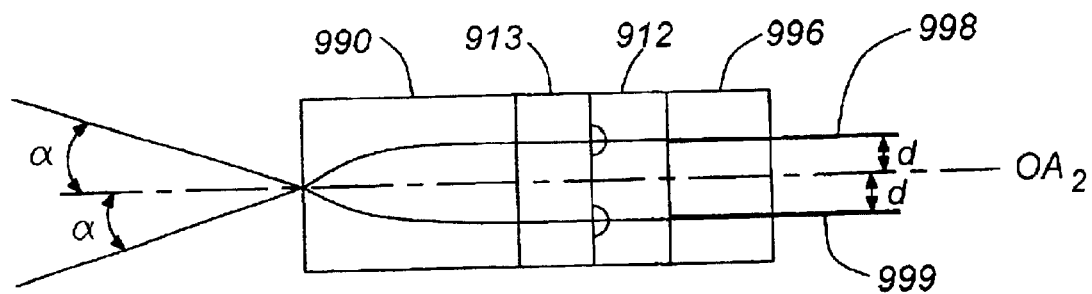
FIG. 9a is a top view showing a lens array coupling input/output optical waveguides to the lens in accordance with the instant invention.

In FIG. 9a the input 999 and output 998 optical fibers are coupled to the GRIN lens 990 via a lenslet array 912. A spacer 913 is provided in accordance with the preferred tele-centric configuration. This optical arrangement, which does not provide polarization diversity, is suitable for applications that do not involve polarization sensitive components.

Figure 9B:
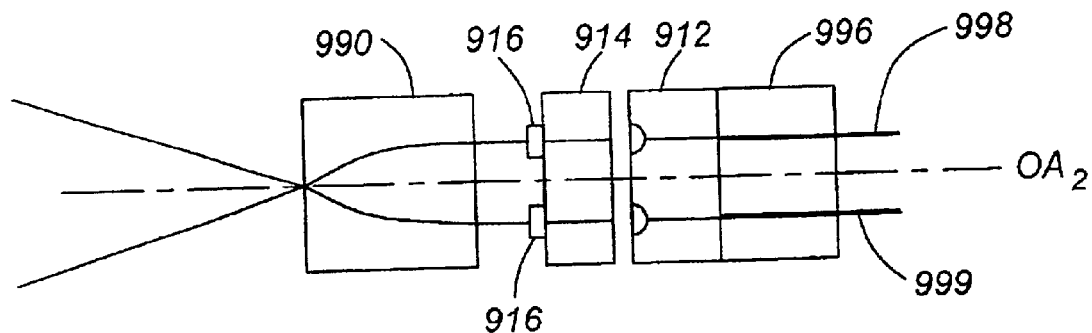
FIG. 9b is a top view showing a prior art polarization diversity arrangement coupling input/output optical waveguides to the lens in accordance with the instant invention.
Figure 9C:
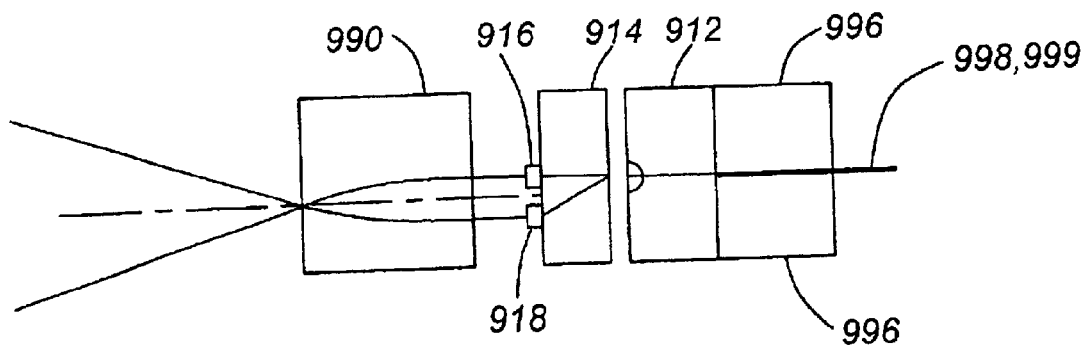
FIG. 9c is a side view of the prior art polarization diversity arrangement shown in FIG. 9b.

FIGS. 9b and 9c depict top and side views of the embodiment where a front-end unit, i.e. as shown in FIG. 2a, couples the input/output waveguides 999/998 to the GRIN lens 990. More specifically, the front-end unit includes sleeve 996, lenslet array 912, birefringent element 914, half waveplates 916, glass plates or second waveplates 918, and GRIN lens 990.

Figure 9D:
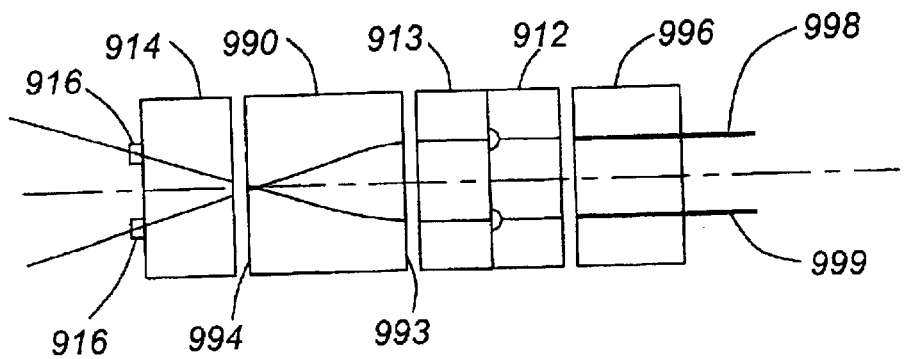
FIG. 9d is a top view showing an alternative arrangement to the optical components shown in FIG. 9b.
Figure 9E:
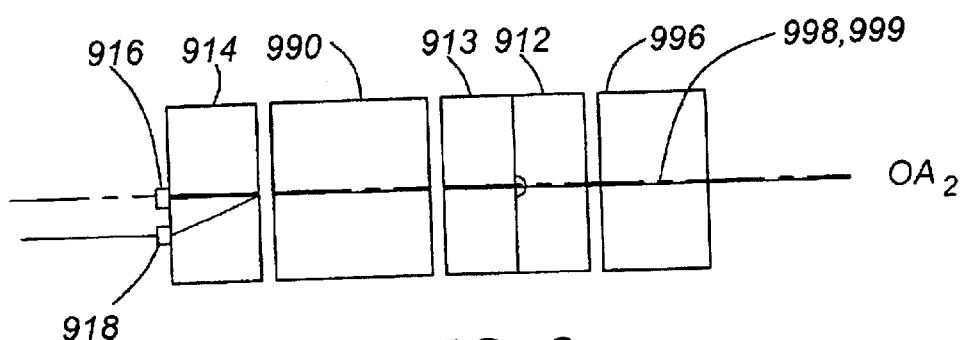
FIG. 9e is a side view of the alternate arrangement shown in FIG. 9d.

In FIGS. 9d and 9e there is shown top and side views of an arrangement wherein the birefringent element 914, half waveplates 916, and glass plates 918, which provide the polarization diversity, are disposed about end face 994 of GRIN lens 990 and a spacer 913 the lenslet array 912 are disposed about end face 993.

Figure 9F:
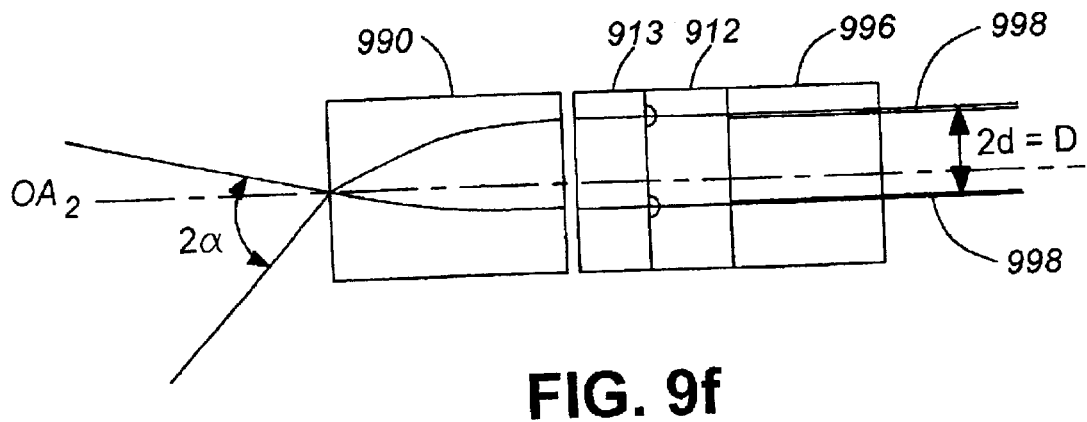
FIG. 9f is a top view showing an asymmetric offset of the input/output optical waveguides with respect to the optical axis of the lens, in accordance with the instant invention.

FIG. 9f illustrates an embodiment wherein the input 999 and output 998 optical waveguides are not symmetrically disposed about the optical axis $OA_2$ of the GRIN lens 990. In these instances, it is more convenient to compare the fixed distance between the input 999 and output 998 waveguides (D=2d) to the total angle between the input and output optical paths (2α). More specifically, the relationship is given approximately as:

$$\frac{D}{F} = 2\alpha$$

where F is the focal length of the GRIN lens 990.

Figure 10:
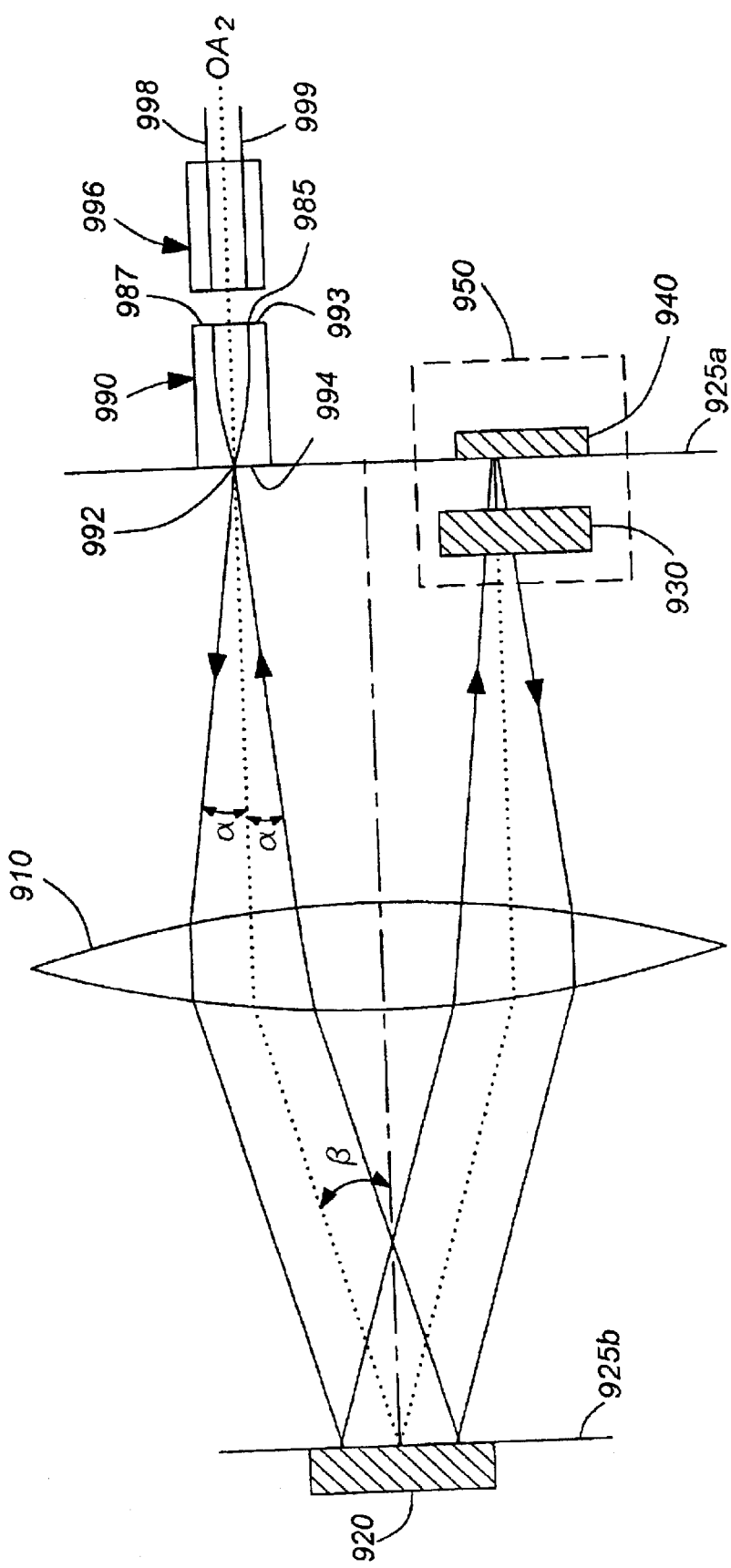
FIG. 10 is a schematic diagram of another embodiment of a DGE/COADM in accordance with the invention.

Of course other variations in the optical arrangement are possible. For example, in some instances, it is preferred that the diffraction grating 920 is disposed at an angle to the focal plane 925. In addition, the placement of the front end unit/lens 990, diffraction grating 920, and modifying means 950 can be selected to minimize aberrations associated with the periphery of the element having optical power 910. In FIG. 10, an alternative design of FIG. 9, wherein the element having optical power is a lens 910 having two focal planes, 925a and 925b is illustrated. The diffraction grating 920 is coincident with focal plane 925b and the reflector 940 is coincident with focal plane 925a. The operation is similar to that discussed for FIG. 9.

An advantage of the embodiments including a GRIN lens 990, e.g. as shown in FIGS. 9–9d, is that they are compatible with modifying means based on MEMS technology, for both COADM and DGE applications. This is in contrast to the prior art optical arrangements described in FIGS. 1 and 6–8, wherein the MEMS based modifying means 150 are preferred for DGE applications over COADM applications.

In particular, when the single collimating/focusing lens 990 provides the input beam of light and receives the modified output beam of light, the angular displacement provided by each MEMS reflector complements the angular displacement resulting from the use of the off-axis input/output port(s) on the GRIN lens 990. More specifically, the angular displacement provided by the lens 990, e.g. α, is chosen in dependence upon the angular displacement of the MEMS device, e.g. 1°.

Figure 11:
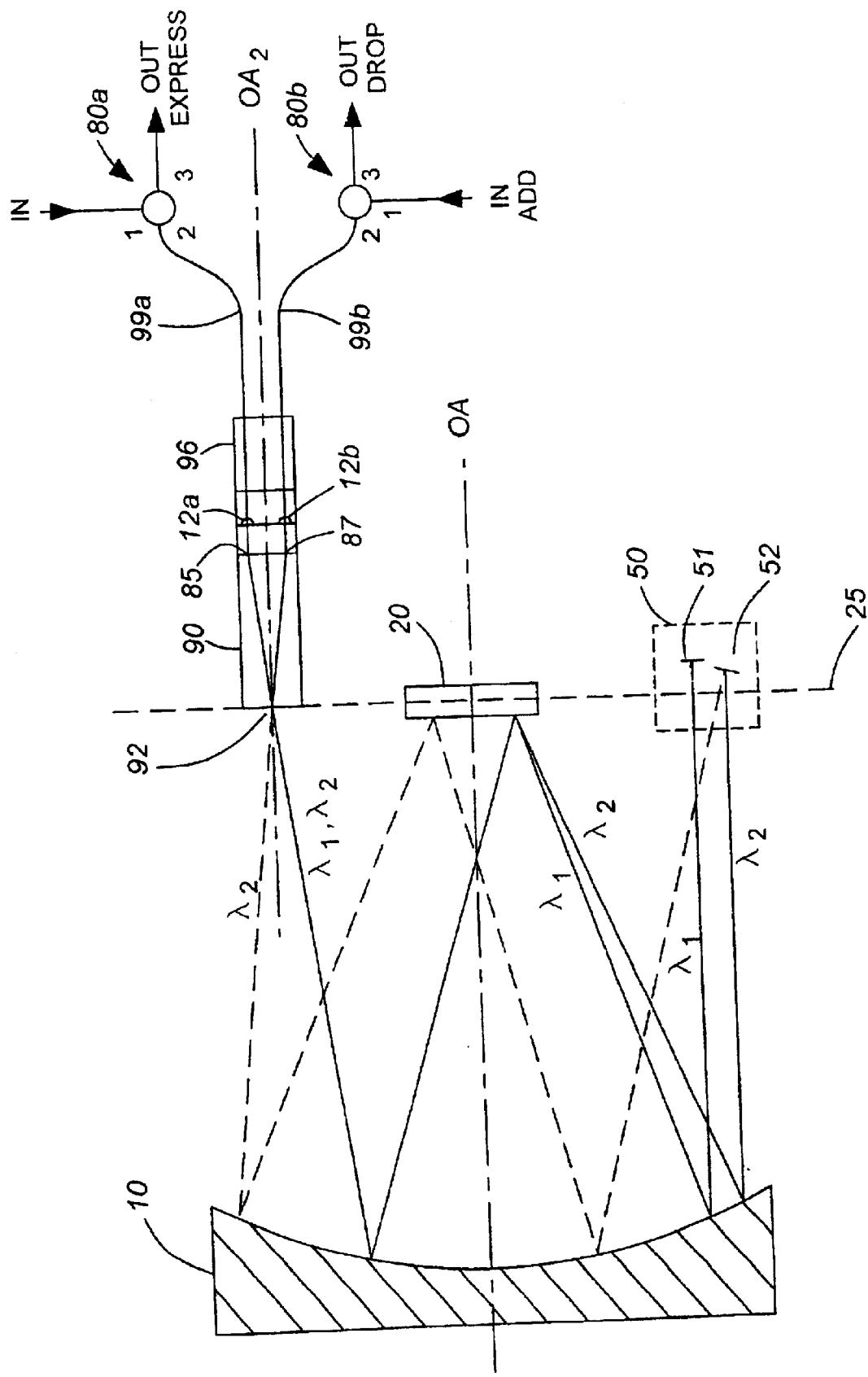
FIG. 11 is a schematic diagram of the preferred embodiment of a COADM in accordance with the instant invention.

A preferred embodiment is illustrated in FIG. 11, wherein an arrangement similar to that shown in FIG. 9 designed to operate as a COADM. Optical circulators 80a and 80b are coupled to each of the optical waveguides 99a and 99b, respectively, for separating in/out and add/drop optical signals. Optical waveguides 99a and 99b are optically coupled to micro-lenses 12a and 12b disposed on one side of the lens 90.

The lens 90 is disposed such that an end thereof lies in the focal plane 25 of the spherical reflector 10. Also in the focal plane are the dispersive element 20 and the modifying means 50, as described above. However, in this embodiment, the modifying means is preferably a MEMS array 50. Notably, the MEMS array provides a 2×2 bypass configuration wherein an express signal launched into port 1 of the circulator 80$a$ propagates to port 3 of the same circulator 80$a$ in a first mode of operation and a dropped signal propagates to port 3 of the second circulator 80$b$ in a second mode of operation. Similarly, a signal added at port 1 of the second circulator device 80$b$ propagates to port 3 of the first circulator 80$a$ in the second mode of operation, but is not collected in the first mode of operation. For exemplary purposes, the beam of light is assumed to include wavelengths $\lambda_1$ and $\lambda_2$, however, in practice more wavelengths are typically used.

In operation, a beam of light carrying wavelengths $\lambda_1$ and $\lambda_2$, is launched into port 1 of the first optical circulator 80$a$ and is circulated to optical waveguide 99$a$ supported by sleeve 96. The beam of light is transmitted through the micro-lens 12$a$ to the lens 90, in a direction substantially parallel to the optical axis (OA$_2$) of the lens 90. The beam of light enters the lens 90 through port 85 disposed off the optical axis (OA$_2$) and emerges from port 92 coincident with the optical axis (OA$_2$) at an angle to the optical axis (OA$_2$). The emerging beam of light $\lambda_1\lambda_2$, is transmitted to an upper portion of the spherical reflector 10, is reflected, and is incident on the diffraction grating 20, where it is spatially dispersed into two sub-beams of light carrying wavelengths $\lambda_1$ and $\lambda_2$, respectively. Each sub-beam of light is transmitted to a lower portion of the spherical reflector 10, is reflected, and is transmitted to separate reflectors 51 and 52 of the MEMS array 50. Referring to FIG. 11, reflector 51 is orientated such that the sub-beam of light corresponding to $\lambda_1$ incident thereon, is reflected back along the same optical path to the lens 90, passes through port 85 again, and propagates to port 2 of circulator 80$a$ where it is circulated to port 3. Reflector 52, however, is orientated such that the sub-beam of light corresponding to $\lambda_2$ is reflected back along a different optical path. Accordingly, the dropped signal corresponding to wavelength $\lambda_2$ is returned to the lens 90, passes through port 87, propagates to port 2 of the second circulator 80$b$, and is circulated to port 3.

Simultaneously, a second beam of light having central wavelength $\lambda_2$ is added into port 1 of the second optical circulator 80$b$ and is circulated to optical waveguide 99$b$. The second beam of light $\lambda_2$ is transmitted through the micro-lens 12$b$ to the lens 90, in a direction substantially parallel to the optical axis (OA$_2$) of the lens 90. It enters the lens 90 through port 87 disposed off the optical axis (OA$_2$) and emerges from port 92 coincident with the optical axis (OA$_2$) at an angle to the optical axis. The emerging beam of light is transmitted to an upper portion of the spherical reflector 10, is reflected, and is incident on the diffraction grating 20, where it is reflected to reflector 52 of the MEMS array 50. Reflector 52 is orientated such that the second beam of light corresponding to $\lambda_2$ is reflected back along a different optical path to the spherical reflector 10, where it is directed to the diffraction grating 20. At the diffraction grating 20, the added optical signal corresponding to $\lambda_2$ is combined with the express signal corresponding to $\lambda_1$. The multiplexed signal is returned to the lens 90, passes through port 85, and returns to port 2 of the first circulator 80$a$ where it is circulated out of the device from port 3.

Of course, numerous other embodiments may be envisaged, without departing from the spirit and scope of the invention. For example, in practice it is preferred that each reflector of the MEMS array is deflected between positions non-parallel to focal plane 25, i.e. the deflection is not equivalent to the 45° and 0° deflections illustrated heretofore. In these instances, it is preferred that the optical waveguides coupled to the lens 90 be asymmetrically disposed about the optical axis OA$_2$, as illustrated in FIG. 9$d$.

Figure 12:
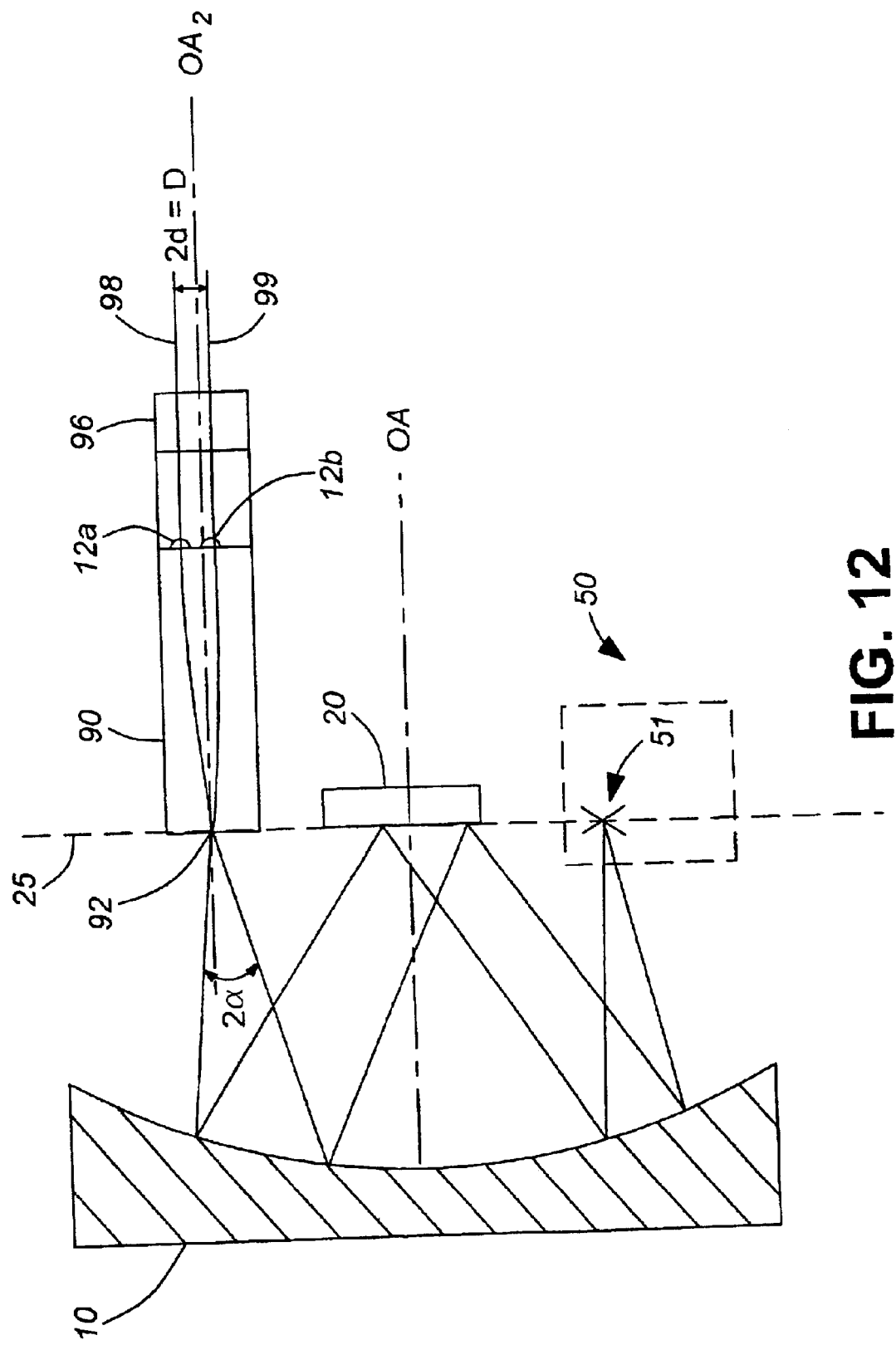
FIG. 12 is a schematic diagram of a COADM in accordance with the instant invention, wherein an asymmetric arrangement of the input/output optical waveguides complements the angular displacement provided by a MEMS element.

For example, FIG. 12 illustrates how strategic placement of the optical waveguides 99 and 98 can complement the angular displacement provided by the MEMS reflector 51. Moreover, it is also within the scope of the instant invention for the MEMS array to flip in either a horizontal or vertical direction, relative to the dispersion plane. Furthermore, any combination of the above embodiments and/or components are possible.

Figure 13:
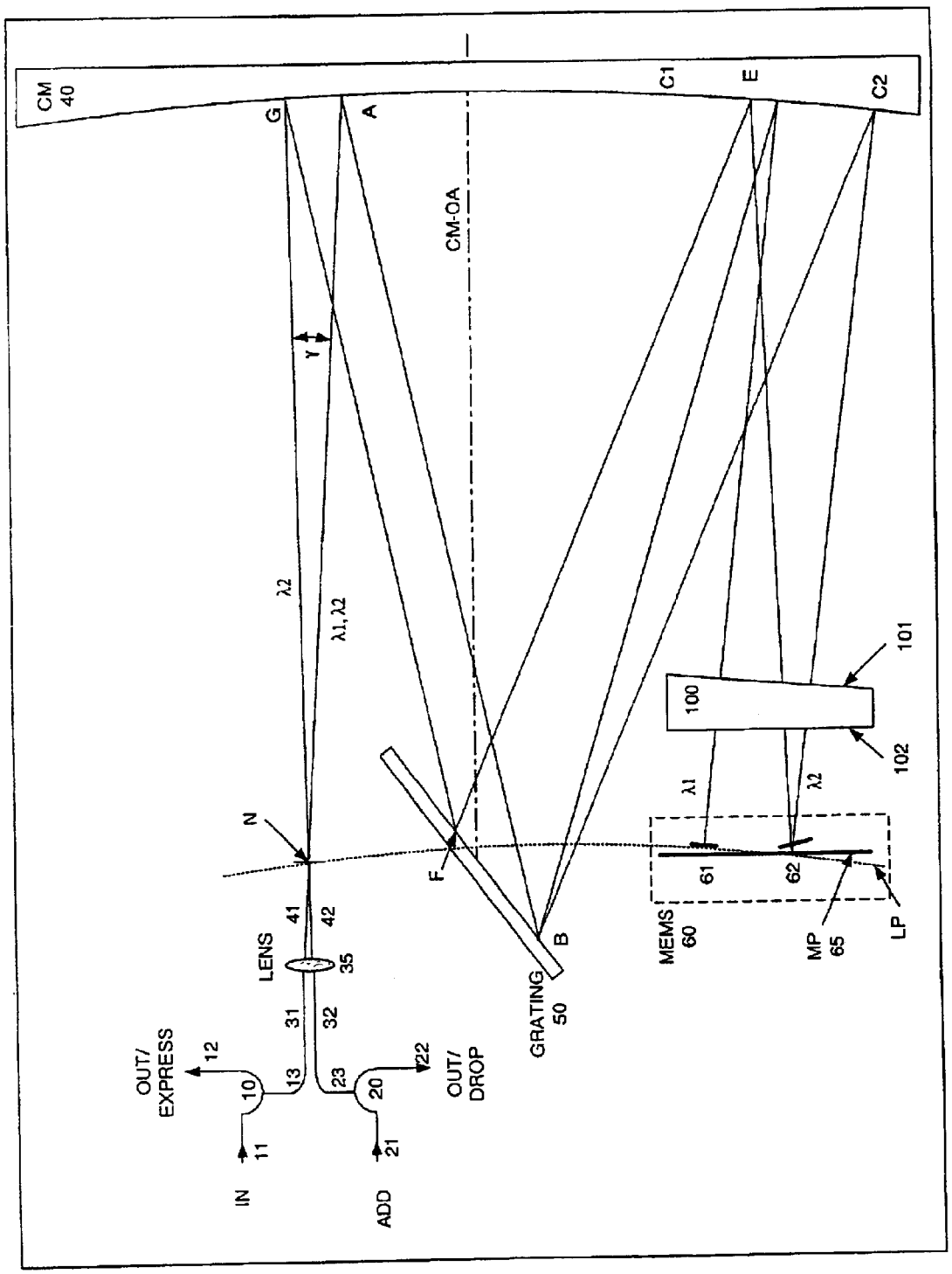
FIG. 13 is a schematic diagram of a COADM in accordance with the present invention including a correction element.

In accordance with another aspect of the invention, shown in the COADM diagram of FIG. 13, a transmission path correction element 100 is installed between the redirecting element (a concave mirror 40) and the modifying (MEMS array 60). The purpose of this correction element is to modify the paths of the optical signals focused by the concave mirror 40, so as to effectively rotate the 'best fit' planar surface approximation FP into coplanar coincidence with the optical signal-receiving surface MP of the MEMS array. Non-limiting examples of a suitable (field-flattening) transmission path correction element that may be used for this purpose include a portion or segment of a cylindrical lens and an optical transmission wedge. With the curvilinear focal surface LP of the spherical mirror being transformed into a focal plane FP, and with that plane FP being coincident with the MEMS array plane MP, variation in loss (as minimized by the 'best fit' linear approximation of the focal plane) will be effectively eliminated.

I claim:

1. An optical device comprising:
    a first port for launching an input beam of light including a plurality of wavelength channels;
    a second port for receiving at least a portion of one of the plurality of wavelength channels;
    first redirecting means for receiving the input beam of light, the first redirecting means having optical power;
    a dispersive element for receiving the input beam of light from the first redirecting means, and for dispersing the input beam of light into the plurality of wavelength channels along a first series of paths;
    second redirecting means for receiving the dispersed wavelength channels, the second redirecting means having optical power; and
    a plurality of modifying means, each modifying means for receiving one of the dispersed wavelength channels along one of the first series of paths, and for reflecting at least a portion each wavelength channel back along one of the first series of paths or back along one of a second series of paths;
    wherein each of said modifying means includes a first adjustable phase biasing means positioned in each of the first series of paths, and a second adjustable phase biasing means positioned in each of the second series of paths;
    wherein wavelength channels traveling back along one of the first series of paths exit the first port via the second redirecting means, the dispersive element and the first redirecting means; and
    wherein wavelength channels traveling back along one of the second series of paths exit the second port via the second redirecting means, the dispersive element and the first redirecting means.

2. The optical device according to claim 1, wherein the first redirecting means and the second redirecting means comprise a single spherical mirror.

3. The optical device according to claim 1, wherein the dispersive element is a diffraction grating.

4. The optical device according to claim 1, wherein the first adjustable phase biasing means comprises a first liquid crystal array positioned in the first path for rotating the polarization of a selected number of wavelength channels by a desired amount; and wherein the second adjustable phase biasing means comprises a second liquid crystal array positioned in the second path for rotating the polarization of a selected number of wavelength channels by a desired amount.

5. The optical device according to claim 1, wherein the modifying means also includes a polarization beam director for directing the wavelength channels according to their polarization; and a reflective surface for directing the wavelength channels regardless of their polarization.

6. The optical device according to claim 5, wherein the first adjustable phase biasing means rotates the polarization of a selected number of the wavelength channels forming a set of dropped wavelength channels having a first polarization, while substantially unaffecting the polarization of a selected number of wavelength channels forming a set of express wavelength channels having a second polarization; and wherein the polarizing beam splitter directs the express wavelength channels back along the first series of paths to the first port, and directs the dropped wavelength channels back along the second series of paths to the second port.

7. The optical device according to claim 5, wherein the first adjustable phase biasing means rotates the polarization of a selected number of the wavelength channels forming a set of express wavelength channels having a first polarization, while substantially unaffecting the polarization of a selected number of wavelength channels forming a set dropped wavelength channels having a second polarization; and wherein the polarizing beam splitter directs the express wavelength channels back along the first series of paths to the first port, and directs the dropped wavelength channels back along the second series of paths to the second port.

8. The optical device according to claim 6, further comprising:
   a first circulator for directing the input beam of light from a first waveguide to the first port, and for directing the set of express wavelength channels from the first port to a second waveguide; and
   a second circulator for directing the set of dropped wavelength channels from the second port to a third waveguide, and for directing at least one add wavelength channel from a fourth waveguide to the second port;
   wherein the add wavelength channels launched through the second port are combined with the set of express wavelength channels.

9. The optical device according to claim 7, further comprising:
   a first circulator for directing the input beam of light from a first waveguide to the first port, and for directing the set of express wavelength channels from the first port to a second waveguide; and
   a second circulator for directing the set of dropped wavelength channels from the second port to a third waveguide, and for directing at least one add wavelength channel from a fourth waveguide to the second port;
   wherein the add wavelength channels launched through the second port are combined with the set of express wavelength channels.

10. The optical device according to claim 8, further comprising a lens for directing the set of express channels to the first port, and for directing the set of drop channels to the second port.

11. The optical device according to claim 5, wherein each of the first and second ports comprises:
    a lens for collimating light entering the device, and for focusing light exiting the device;
    a polarization beam splitter optically coupled to the lens for splitting light entering the device into two orthogonally polarized sub-beams, and for combining two orthogonally polarized sub-beams of light exiting the device; and
    a polarization rotator for rotating the polarization of at least one of the two orthogonally polarized sub-beams entering the device, whereby both sub-beams have a first polarization, and for rotating the polarization of at least one of the two sub-beams of light exiting the device with the first polarization, whereby both sub-beams have orthogonal polarizations.

12. The optical device according to claim 11, wherein the first or the second adjustable phase biasing means rotates a selected set of wavelength channels from the first polarization to a second polarization;
    wherein the other of the first or the second adjustable phase biasing means has substantially no effect on the selected set of wavelength channels; and
    wherein the polarizing beam director directs the selected set of wavelength channels back along the second set of paths;
    whereby the selected set of wavelength channels is spilled of by the polarization beam splitter and blocked from exiting the second port.

13. The optical device according to claim 11, wherein the first adjustable phase biasing means rotates the polarization of a selected set of wavelength channels by substantially 0° or 90°;
    wherein the polarization beam director directs the selected set of wavelength channels back along the second set of paths; and
    wherein the second adjustable phase biasing means independently rotates the polarizations of the selected set of wavelength channels by between 0° and 90°;
    whereby a portion of each of the selected set of wavelength channels is spilled off and another portion is captured by the second port.

14. The optical device according to claim 11, wherein the first adjustable phase biasing means independently rotates the polarizations of a selected set of wavelength channels by between 0° and 90°;
    wherein the polarization beam director directs a first portion of each of the selected set of wavelength channels with the first polarization back along the second set of paths, and a second portion of each of the selected set of wavelength channels back along the first set of paths; and
    wherein the second adjustable phase biasing means rotates the polarizations of the first portions of each of the selected set of wavelength channels to the second polarization;
    whereby the first portion of each of the selected set of wavelength channels is spilled off, and the second portion of each of the selected set of wavelength channels is captured by the first port.

15. The optical device according to claim 1, wherein the modifying means further comprises a MEMS mirror array for directing selected wavelength channels to the second port and other wavelength channels to the first port.

16. The optical device according to claim 1, wherein each of the first and second redirecting means comprises a lens.

17. The optical device according to claim 1, wherein the first and second redirecting means comprise a same lens.

* * * * *